United States Patent [19]

Donnangelo et al.

[11] Patent Number: 4,910,526
[45] Date of Patent: Mar. 20, 1990

[54] AIRBORNE SURVEILLANCE METHOD AND SYSTEM

[75] Inventors: Nicholas C. Donnangelo, Leesburg; John T. Abaunza, Warrenton; John G. Aiken, Fairfax, all of Va.

[73] Assignee: Avion Systems, Inc., Leesburgh, Va.

[21] Appl. No.: 50,716

[22] Filed: May 18, 1987

[51] Int. Cl.[4] ............................................. G01S 13/93
[52] U.S. Cl. ..................................... 342/455; 342/32; 342/37; 342/46
[58] Field of Search ..................... 342/455, 32, 37, 46, 342/29, 30, 36, 42

[56] References Cited

U.S. PATENT DOCUMENTS

| | | | |
|---|---|---|---|
| Re. 29,260 | 6/1977 | Litchford | 342/147 |
| 3,550,129 | 12/1970 | Steele . | |
| 3,626,411 | 12/1971 | Litchford . | |
| 3,713,161 | 1/1973 | Rice . | |
| 3,757,324 | 9/1973 | Litchford . | |
| 3,792,472 | 2/1974 | Payne et al. . | |
| 3,858,210 | 12/1974 | Litchford . | |
| 3,858,211 | 12/1974 | Litchford . | |
| 3,875,570 | 4/1975 | Litchford . | |
| 3,895,382 | 7/1975 | Litchford . | |
| 3,921,172 | 11/1975 | Litchford . | |
| 3,959,793 | 5/1976 | Litchford . | |
| 4,021,802 | 5/1977 | Litchford . | |
| 4,027,307 | 5/1977 | Litchford | 342/32 |
| 4,050,068 | 9/1977 | Berg et al. | 342/55 X |
| 4,107,674 | 8/1978 | Funatsu et al. . | |
| 4,115,771 | 9/1978 | Litchford | 342/37 |
| 4,128,839 | 12/1978 | McComas . | |
| 4,161,729 | 7/1979 | Schneider . | |
| 4,191,958 | 3/1980 | Hulland et al. . | |
| 4,196,434 | 3/1980 | Funatsu et al. . | |
| 4,232,313 | 11/1980 | Fleishman | 364/452 |
| 4,293,857 | 10/1981 | Baldwin . | |
| 4,486,755 | 12/1984 | Hulland et al. | 342/32 |
| 4,642,648 | 2/1987 | Hulland et al. | 342/455 |
| 4,733,241 | 3/1988 | Litchford et al. . | |
| 4,768,036 | 8/1988 | Litchford et al. . | |
| 4,783,744 | 11/1988 | Yueh | 364/454 |

OTHER PUBLICATIONS

Lin et al, "The TM5320 Family of Digital Signal Processors", Proc. of IEEE, vol. 75, No. 9, Sep. 1987, pp. 1143–1159.

Primary Examiner—Nelson Moskowitz
Assistant Examiner—John B. Sotomayor
Attorney, Agent, or Firm—Birch, Stewart, Kolasch & Birch

[57] ABSTRACT

An airborne surveillance method and system allows an observer aircraft to determine the position and change of position of a multiplicity of target aircraft and thus allows analysis of collision threats from these aircraft. The system uses a phase comparison direction finding antenna to determine direction of nearby ground based SSRs and all target aircraft of interest. The system further makes use of all other available data including Mode C transponder generated altitude information of the target aircraft, the altitude of the observer aircraft, the received signal strength of both the SSR beam and the received transponder signal, the time difference of arrival between the SSR interrogation signal and the response from the target aircraft, and a variety of other factors to determine the position of the target aircraft. The system compensates for the attitude of the observer aircraft and performs optimal Kalman filtering on the input data set to produce an estimate on target position based upon prior estimates and upon information contained in the data set while making estimates of the error magnitude of each measurement and compensating for these errors. The covariance matrix Q of the Kalman filter is adaptively vaired so as to optimize the estimate of the degree of correlation between various input values.

26 Claims, 9 Drawing Sheets

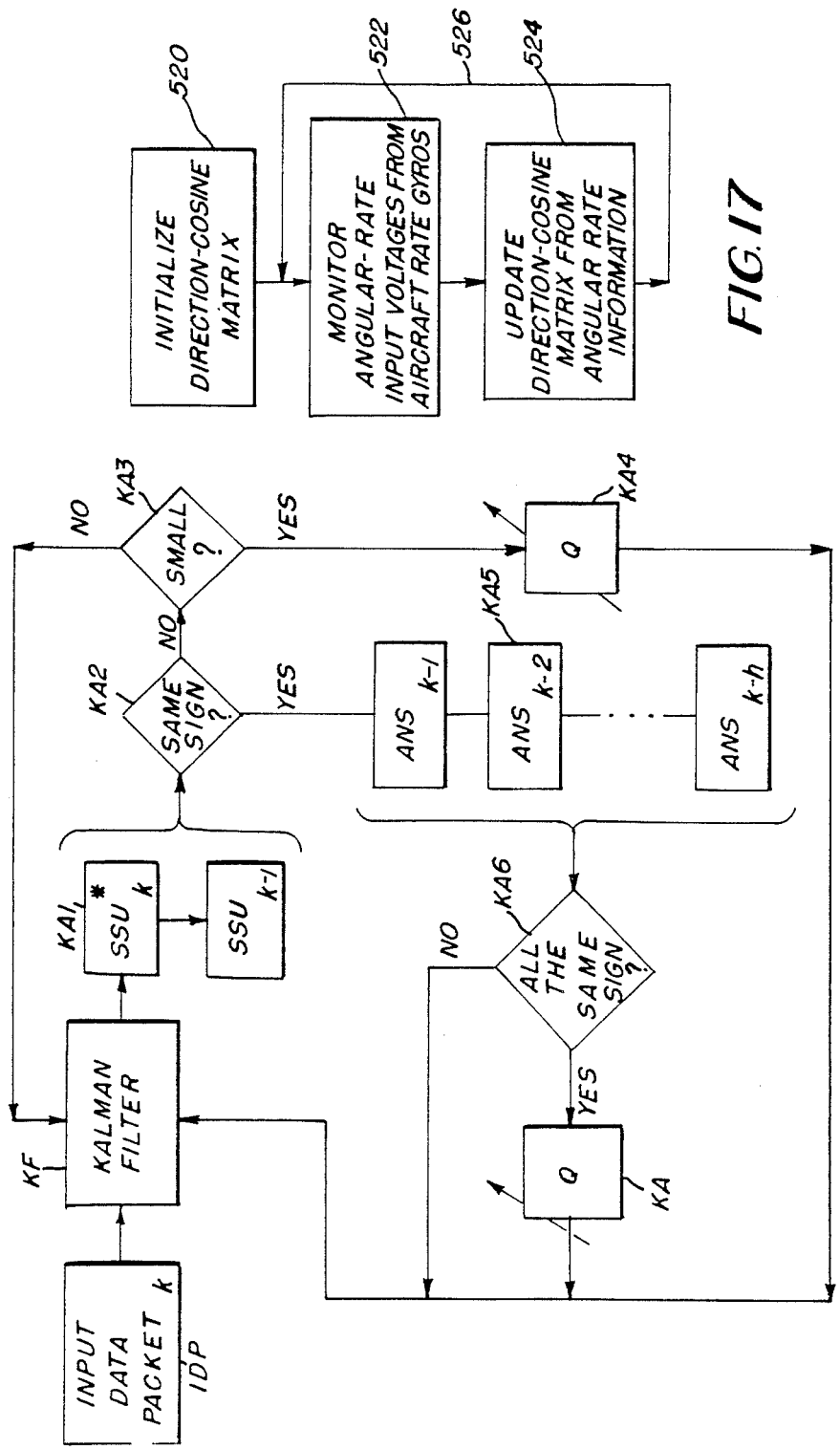

AIRBORNE SURVEILLANCE METHOD AND SYSTEM

FIELD OF THE INVENTION

The present invention relates to a surveillance system for determining the presence and location of transponder equipped objects operating in the proximity of an observer location. More particularly, the present invention relates to an airborne surveillance system for determining range, bearing, and velocity information of target aircraft relative to an observer aircraft as well as for determining the location of the observer aircraft in space.

BACKGROUND OF THE INVENTION

Major airports and way points presently are equipped with secondary surveillance radars (SSRs) such as used in the National Air Traffic Control Radar Beacon System. These SSRs are designed to cooperate with transponders carried on aircraft to provide for the transmission of identification and other data, such as altitude data, from the aircraft to the SSR. An air traffic controller observing a radar display directs the pilots of an involved aircraft by radio, usually with voice communication, so as to maintain or restore safe separations between aircraft. Such a system is limited in capability because each aircraft must be dealt with individually and requires its share of the air traffic controller's time and attention. When traffic is heavy, or visibility is low, a possibility of collision increases.

Current SSR systems transmit a beacon at 1030 MHz. The beacon includes three pulses of 0.8 microsecond durations with a first and last pulse, P1 and P3, being 8 or 21 microseconds apart. The SSR beam normally has an azimuthal beamwidth of from 3 to 4 degrees. If the P3 pulse is delayed 8 microseconds from the P1 pulse, then the SSR is requesting the identity of a receiving aircraft. This pulse delay scenario is called Mode A. If the P3 pulse is delayed 21 microseconds from the P1 pulse, then the SSR is requesting the altitude of the receiving aircraft. This pulse delay scenario is called Mode C.

The P2 pulse is transmitted two microseconds after the P1 pulse and between the P1 and P3 pulses. The P2 pulse is transmitted from a co-located omnidirectional antenna and is compared in amplitude with the P1 pulse in a transponder located on an aircraft to suppress responses to undesired sidelobes created when the P1 and P3 pulses are transmitted from a directional antenna. Only when the amplitude of the received P1 pulse exceeds that of the received P2 pulse does the transponder on the aircraft radiate a response.

A secondary surveillance radar in a particular geographic location has a locally unique pulse repetition frequency (PRF) which can vary between 250 and 450 pulses per second in intervals of 4 or 5 Hz. The PRF for the secondary surveillance radar is locally unique to aid in air traffic "defruiting" (discriminating synchronous garble produced by other SSRs).

In general, each aircraft transponder is sequentially interrogated in two modes: one for its identity, Mode A, and the other for its altitude, Mode C. The replies to these alternating interrogations are demodulated at the SSR ground site and data are linked to an Air Traffic Control Center for evaluation. Similar to the case for secondary surveillance radar PRF, the alternating sequence of Mode A, Mode A and Mode C, or Mode S transmissions are unique for each SSR in a particular geographic location.

The transponder signal includes two framing pulses which are spaced 20.3 microseconds apart. The interval between the framing pulses includes a number of discrete sub-intervals, in each of which a pulse may or may not be transmitted.

The sequence of sub-intervals containing data define the type and content of the information being transmitted. Twelve binary code groups, each representing one or more pieces of information such as identification, barometric altitude and/or a distress signal. The desired four digit identification code group may be set into the transponder by the pilot of the aircraft using an analog wheel switch, or in some cases automatically or semi-automatically.

The first framing pulse of the reply of a transponder follows the end of a received interrogation by a standard delay of 3 $\mu$s plus or minus 0.5 $\mu$s. Each of the data-carrying pulses has a width of 0.45 $\mu$s. The minimum interval between pulses is 1.0 $\mu$s. The second framing pulse is transmitted 20.3 $\mu$s after the first framing pulse. The transponder is then disabled for a period of about 125 $\mu$s called the "dead time."

Of the over 271,000 aircraft licensed to operate by the FAA, approximately 80 percent are equipped with transponders which reply to interrogations received from SSR ground stations. Within the continental U.S., most above-ground-level altitudes higher than 2000 feet are "illuminated" by one or more SSRs. In some areas, as many as thirty SSRs may be within a line-of-sight. As each SSR beam sweeps past an aircraft, it interrogates that aircraft's transponder from approximately 15 to 25 times at intervals of about 2 to 5 milliseconds. Each secondary surveillance radar transmits a pulse at 1030 MHz, which elicits a reply transmission from the transponder at a frequency of 1090 MHz.

Current transponders are designed to transmit an identification code (Mode A) and in some cases the altitude (Mode C) of the instrumented aircraft. It is estimated that only 40 percent of all transponder-equipped aircraft have altitude-transmitting transponders. However, the FAA recently has increased the number of Terminal Control Areas requiring Mode C transponder equipped aircraft from 13 to over 200. In addition, the state of California recently has passed legislation mandating the use of Mode C transponders statewide. Thus, many more aircraft will be required to have Mode C capable transponders in the near future.

A Mode S interroqation beacon system (SSR) has also been developed for use in the future. The Mode S beacon system was developed as an evolutionary improvement to the ATCRBS system to enhance air traffic control surveillance reliability and to provide a ground-air-ground digital data communication capability. Each aircraft will be assigned a unique address code which permits data link messages to be transferred along with surveillance interrogations and replies.

Like ATCRBS, the Mode S system will locate an aircraft in range and azimuth, report its altitude and identity, and provide the general surveillance service already available. However, because of its ability to selectively interrogate only those aircraft within its area of responsibility, Mode S can avoid the interference which results when replies are generated by all of the transponders within the beam. If Mode S schedules its interrogations appropriately, responses from aircraft will not overlap each other at the receiver.

Several variants of airborne proximity indicator and collision avoidance systems have been proposed in the last three decades. The Traffic-Alert/Collision Avoidance System (TCAS) as proposed by the Federal Aviation Administration is a set of system specifications which attempts collision avoidance by having an aircraft-mounted beacon (similar to an SSR) interrogate and stimulate a coded response from surrounding transponder-equipped target aircraft. Target location is determined via a determination of polar timing and direction finding.

A collision-avoidance/proximity-warning system is disclosed in U.S. Pat. No. 4,027,307 issued to Litchford, for determining passively the range and bearing of those mobile vehicles within a selectable proximity to an observer's mobile vehicle position from interrogation replies of the target mobile vehicle transponders and the interrogation of a secondary surveillance radar. This system employs a direction-finding antenna and circuits for indicating the angle of incidence of transponder replies and means for determining the slant range to the replying transponders dependent on the time of receipt of the transponder replies relative to SSR interrogation reception. The slant range may be determined either entirely passively from a bearing measurement and measurement of the difference between the time of receipt of the interrogation and a corresponding transponder reply as long as at least two SSR beams are being interrogated, or is determined actively by transmitting interrogation signals and measuring the time difference between the transmission and target-aircraft transponder reply in a manner similar to TCAS.

The '307 Litchford patent utilizes an amplitude sensitive direction finder to determine the bearing of sensed signals and determines the location of the owned aircraft and the intruder aircraft based solely on the present values of sensed parameters.

OBJECTS OF THE INVENTION

It is an object of the present invention to provide a proximity-indicating surveillance system for detecting, locating, and tracking a target object equipped with a transponder responsive to at least one scanning radar of a secondary radar system using completely passive means.

It is another object of the present invention to provide proximity-indicating surveillance system for detecting, locating and tracking target aircraft equipped with transponders using passive receipt of at least one secondary surveillance radar and associated target aircraft transponder signals.

Another object of the present invention is to provide a proximity-indicating surveillance system for determining the azimuthal and elevation bearing of a received signal using phase-comparison direction-finding on an airborne short-baseline interferometric array and target Mode C barometric altitude data when available, where bearing measurements are corrected for attitude of the observer aircraft.

It is another object of the present invention to provide a proximity indicating surveillance system which tracks the locations of the observer aircraft and target aircraft based not only on the present state of sensed variables, but also based in part upon the past states of these variables n a weighted fashion.

It is a further object of the present invention to provide a proximity-indicating surveillance system which considers a number of variables representative of target and observer aircraft position, velocity and acceleration, while adaptively varying the weight each variable has on the resolved positions.

It is a further object of the present invention to provide a proximity-indicating surveillance system which utilizes Kalman filtering to predict the present location, velocity and acceleration of observer and target aircraft based upon the present and past states of various variables available.

It is still a further object of the present invention to provide a proximity-indicating surveillance system and method which determines the position of both observer and target aircraft regardless of the attitude or even rate of change of attitude of the observer aircraft.

It is still a further object of the present invention to enable determination of the location of the observer aircraft from stored data representative of the location and identifying characteristics of secondary surveillance radars to be encountered as well as the detected direction of such radar.

It is an additional object of the present invention to utilize a proximity-indicating surveillance system as described in the present specification to determine the relative collision threat created by each target aircraft and to display these collision threats to the pilot.

It is an additional object of the present invention to optimize the selection of SSR interrogation radar monitored by the system of the present invention based upon their signal strength and relative azimuth bearing to enhance system accuracy.

It is still another object of the present invention to store target aircraft location data in a battery-backed up ruggedized RAM for a tracking period in excess of thirty minutes to maintain a log of local aircraft activities in the event of an accident or other catastrophe.

These and other objects of the present invention are achieved by providing the proximity-indicating surveillance method and system described in the present specification.

SUMMARY OF THE INVENTION

The present invention is directed to a method of locating the position of at least one target object (in the preferred embodiment, one or more aircraft to be monitored) carrying an interrogation signal responsive transponder from an observer object (an aircraft carrying the system, in the preferred embodiment) where the system operates in an environment having at least one rotating interrogation signal source (an SSR radar in the preferred embodiment). The method of the present invention determines the direction of the interrogation signal source by direction finding on the interrogation signal to develop source direction data; determines the direction to a said target object by direction finding on a transponder signal produced by said transponder to develop target direction data; assembles additional available data relevant to relative positions of said objects and/or said interrogation signal source; develops a present position estimate of said target object based on said direction data and said additional data; and updates a past position value with said estimate of present position to determine a present position value of said target. The present invention performs this method in an environment having as little as one rotating interrogation signal source and performs the method entirely passively without use of an observer object located interrogation signal source.

The method of the present invention is performed by a system having phase detecting direction finding antenna means for developing a first direction signal representative of the direction of a said rotating interrogation signal source and for developing a second direction signal representative of the direction of each target object by detecting the target object's interrogation signal response to transponder; means for assembling additional data relevant to relative positions of said objects and said interrogation signal source; means, responsive to said first and second direction signals and said additional available data, for developing a present position estimate for the relative position of each said target object; means for storing a past position value of each said target object; and Kalman filtering means for updating the past position value with said estimate of present position to determine a present position value of each said target object. The present invention further includes means for estimating the error in said first and second direction signals and said additional available data to develop error data associated with said data; means for developing a current position error estimate using said error data; said Kalman filtering means adjusting the weight given said present position estimate in determining said present position value based upon said error data.

The present invention may be most easily understood with reference to FIG. 1 which graphically illustrates a ground based SSR, observer aircraft 0 and target aircraft T in space. The device of the present invention employing the method of the present invention is mounted on an observer aircraft 0. This observer aircraft is mounted with an interferometric array acting as a phase-comparison direction finding antenna for detecting the direction of the signals received from ground based SSRs and the transponders of target aircraft. As illustrated in FIG. 1, a secondary surveillance rate or SSR1 sweeps an area, including an observer aircraft 0 and a target aircraft T. As explained in the Background of the Invention section of the present application, the SSR generates interrogation signals requesting the generation of an identification code in Mode A and an altitude in Mode C from each transponder carrying aircraft. While some transponder carrying aircrafts will not be provided to a Mode C radar interrogation and thus will not qenerate an altitude code, the device of the present application compensates for this by performing the necessary calculations without Mode C altitude data in the event such data is unavailable. The observer aircraft first determines the bearing to the SSR from the observer aircraft through use of the observer aircraft's direction finding antenna. The observer aircraft further monitors the codes generated by the target transponder of the target aircraft T in response to interrogation from SSR1 with the direction finding antenna. The transponder signal developed by the target aircraft T radiates a standard pulse train including an identification code in response to Mode A interrogation from the secondary surveillance radar SSR1 and, if so equipped, an altitude pulse train in response to a Mode C interrogation from the secondary surveillance radar SSR1.

From direction finding on the SSR interrogation signals and on the transponder-generated responses from the target aircraft, the system of the present invention determines target aircraft bearing and SSR interrogation signal bearing. The system of the present invention further acquires altitude data of the observer aircraft and, if the target aircraft possesses a Mode C transponder, altitude data of the target aircraft is determined from the Mode C transponder-generated response from the target aircraft. Information concerning each SSR signal source is acquired from an SSR database and the attitude of the aircraft is determined by an attitude processor which, in the preferred embodiment, receives angular rate information from the aircraft's rate gyro attitude instrumentation.

The available information is converted into data packets which are used to develop a present position estimate of the observer aircraft in relation to the positions of the SSRs, and the relative position of each target aircraft. An estimate of the error of each item of data is made and is utilized to develop a current position error estimate. Kalman filtering techniques are then used to update a past position value with the current position estimate to determine the current position value. The current position error estimate is utilized to determine the weight to be given the present position estimate in determining the present position value. The Kalman filter has an adaptive covariance matrix (Q matrix) adaptively varying filter bandwidth.

The system of the present invention determines the relative position of each target aircraft and the observer aircraft. From these relative positions and the rate of change of these relative positions, a threat classifier determines the threat to the observer aircraft of collision with each target aircraft and advises the pilot of such threats.

BRIEF DESCRIPTION OF THE DRAWINGS

The present invention will be more fully understood with reference to the attached drawing figures briefly described below in the specification of the present application which describes a preferred embodiment of the present invention.

FIG. 11 is a flow chart illustrating the adaptation algorithm to adaptively vary the covariance matrix Q of the Kalman filter utilized in the state space processor of the present invention;

FIG. 17 is a flow chart illustrating the updating of the direction cosine matrix.

DETAILED DESCRIPTION OF THE PREFERRED EMBODIMENT

Figure 2:
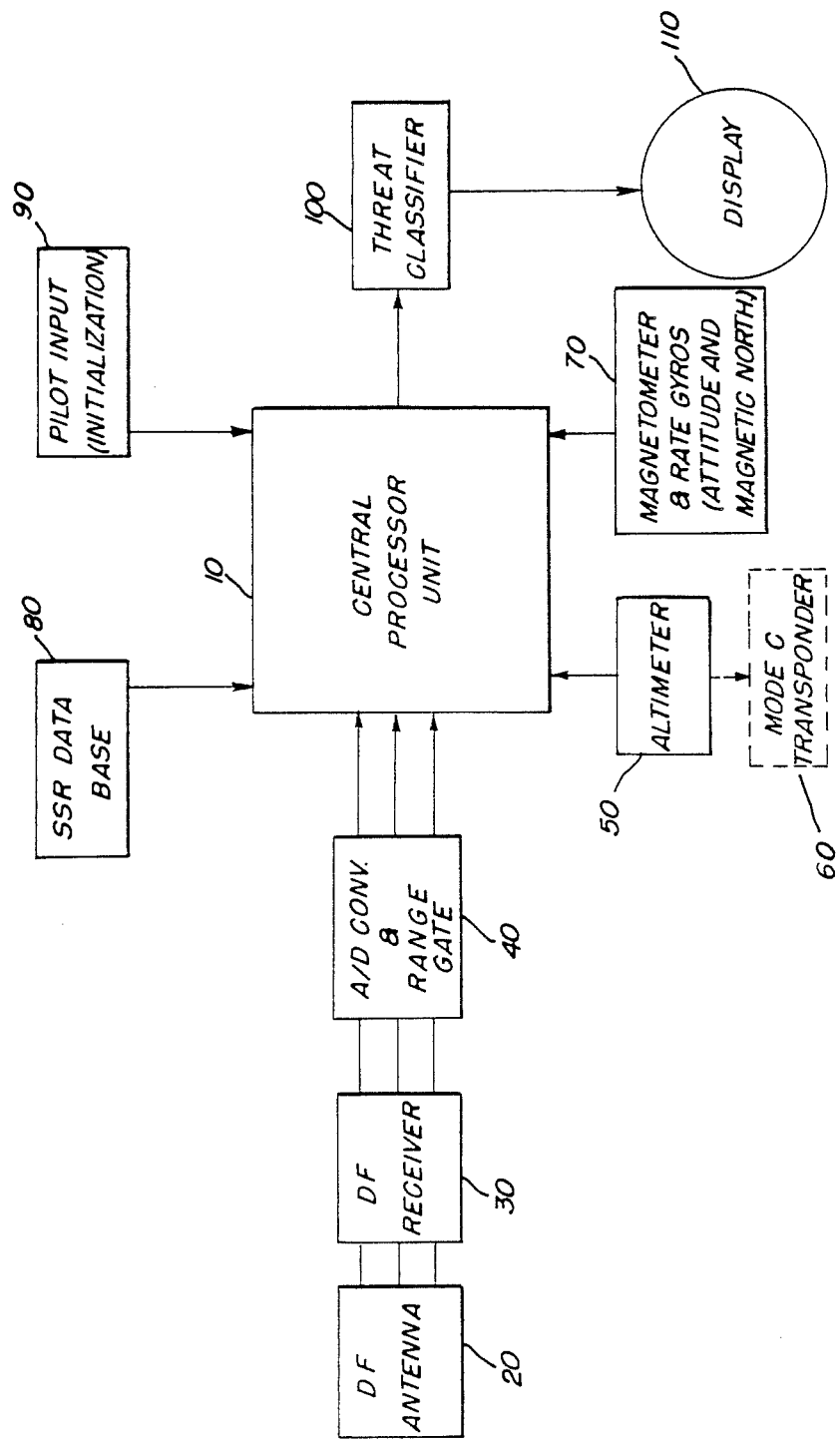
FIG. 2 is a schematic block diagram of the overall hardware system of the preferred embodiment of the present application.

FIG. 2 is a schematic block diagram of the overall hardware system of the preferred embodiment. A central processor unit 10 processes a variety of introduced data to develop observer aircraft position data, and target aircraft position data relative to one or more nearby SSRs used in the position estimation process to develop an optimal-estimate of observer and target aircraft positions. The system of the preferred embodiment includes a phase quadrature direction finding antenna 20 which will be described in greater detail with respect to FIGS. 3(a)–(b). This direction finding antenna 20 includes a phased array of quarter wave antennae arranged in the plane of the observer aircraft. Output signals from the direction finding antenna 20 are processed by a direction finding receiver 30 described in greater detail in FIG. 4. This direction finding receiver produces outputs which are analog-to-digitally converted by an analog-to-digital converter and range gate 40. The outputs of the analog-digital converter and range gate are representative of the direction and amplitude of the received signal.

The central processing unit 10 further receives altitude information defining the altitude of the observer aircraft in which the system of the present invention is disposed. This altitude information is normally developed by an altimeter 50 which may either directly provide a digitally encoded altitude signal to the central processor unit 10 or, alternatively, may provide this altitude information to an observer aircraft based transponder having mode C capabilities which will, upon interrogation by a mode C request of a ground based SSR, transmit a mode C encoded indication of the observer aircraft's altitude. When the observer aircraft is provided with such a mode C transmission capability, the system of the present invention may receive the observer aircraft's altitude data via the system's direction finding antenna 20, direction finding receiver 30, and A/D converter and range gate 40. The central processing unit 10 then receives the altitude data of the observer aircraft and decodes this data in a manner which is identical to the manner in which target aircraft altitude data is accumulated. The system of the preferred embodiment further receives attitude data from an attitude-determining instrument such as a magnetometer, accelerometer or an attitude or attitude-rate sensing device. In the preferred embodiment, a flux gate magnetometer and rate sensors 70 provide attitude information of the aircraft and relates this information to magnetic North.

The central processing unit 10 further receives information from an SSR data base memory 80 which, in the preferred embodiment, stores information relating to SSRs located in the geographical area in which the system of the present invention is to be utilized. It is contemplated, for example, that all SSRs in the continental United States would be included in a typical SSR data base. This data base would normally include the latitude and longitude of each SSR as well as its altitude, pulse repetition frequency (PRF), rotational sweep rate, signal strength, mode A/mode C interrogation transmission sequence.

The system of the present invention further is provided with a pilot input 90 which is used to initialize the system prior to initiation of a flight. Typically, the pilot will initialize the latitude and longitude of the observer aircraft's departure airfield, as well as its altitude.

The system of the present invention employs the above discussed inputs to resolve the position and velocity of the observer aircraft and all target aircraft. The magnitude of error of each parameter used to determine position and velocity is estimated. The current state of the position and velocity estimate of each aircraft is based upon the past estimates and present data of the position and velocity of the aircraft. Adaptive Kalman filtering is used to develop optimal estimates of present position of the observer aircraft and each target aircraft. When similar geometries occur, the system of the present invention's Kalman filtering techniques allow the system to generate estimates based to a greater extent on past estimates while deweighting present data. These functions are performed within the CPU 10.

The central processing unit 10 performs the above mentioned functions to continuously update position and velocity information of the observer aircraft and all target aircraft. This information is then provided to a threat classifier 100 which determines the separation distance in the plane of the earth, and the altitude separation, and based upon these distances and the rate of change of altitude and the rate of change of the separation distance and the rate of change of the line of sight angle, determines the degree of threat of collision between each target aircraft and the observer aircraft. This information is then displayed on a suitable display 110 which in the preferred embodiment is a flat-panel display for displaying information indicating the positions and velocities of all nearby target aircraft with respect to the observer aircraft and developing visual and aural warnings when a threat of collision is present. Such visual and aural warnings become more urgent as the threat of collision increases.

DEFINITIONS

The system of the present invention employs a number of measured and calculated inputs to determine the position and velocity of each target aircraft and of the observer aircraft. An understanding of each of the terms used to describe these values is necessary to appreciate the operation of the preferred embodiment of the present invention.

Figure 1:
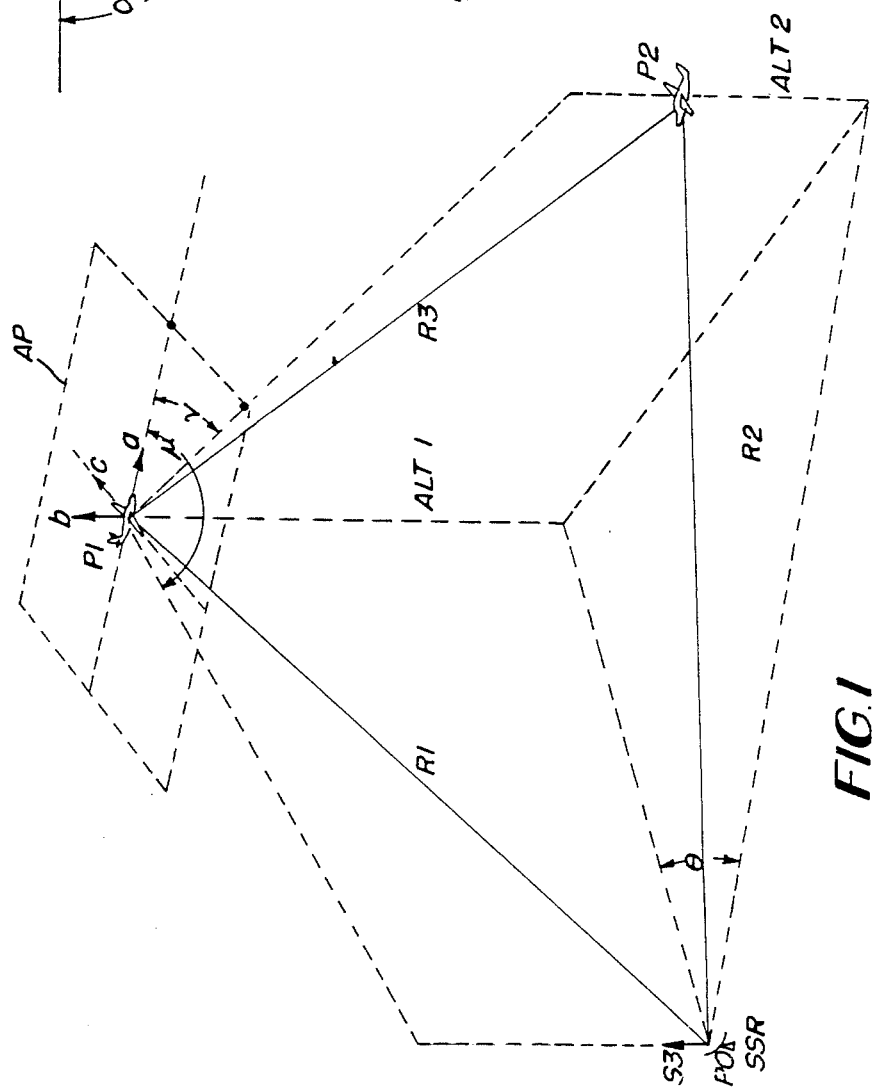
FIG. 1 is a graphic illustration of an observer aircraft O and target aircraft T at points P1 and P2 in space, respectively, and their relationship to a ground based SSR at point P0 in space.

FIG. 1 schematically illustrates a relationship between an observer aircraft, a single target aircraft, and a single ground based SSR. The direction finding antenna 20 of an observer aircraft 0 receives the Mode A, Mode A and Mode C, or Mode S interrogation signals from an SSR in FIG. 1. The Mode A, Mode A and Mode C, or Mode S interrogation signals interrogate the aircraft based transponders of both the observer aircraft 0 and a target aircraft T. The direction finding antenna 20 of the observer aircraft determines the direction of the received signals with reference to an aircraft plane AP determined by the plane of the direction finding antenna 20. The Mode A, Mode A and C, or Mode S interrogation signals generated by the SSR are detected by the direction finding antenna 20 to be a direction $\mu$(mu) with respect to the aircraft plane. Similarly, the Mode A, Mode A and Mode C, or Mode S interrogation signals of the SSR are received by target aircraft T, triggering the generation of a transmitted identification or altitude signal. Upon receipt of this transmitted identity or altitude signal from the target aircraft T, the direction finding antenna 20 determines the direction of the target aircraft with respect to the direction of travel of the observer aircraft in the aircraft plane AP to be the angle $\nu$ (nu). An additional relevant parameter in the system of the present invention is the time difference of arrival TDOA between receipt, by the observer aircraft 0, of the interrogation signal from the SSR and receipt of the transponder generated identity code or altitude signal from the target aircraft T. By subtracting the generally known delay between receipt of the interrogation signal by the target aircraft and generation of the encoded identity or identity and altitude signal by the target aircraft from the TDOA, and by multiplying this value by a constant representative of the velocity of the radio signal, the difference between the radius R1 of FIG. 1 and the sum of the radius' R2 and R3 may be determined. This difference in the distance of R1 and the sum of the distances of R2 and R3 of FIG. 1 places the target aircraft on an ellipsoid (three-dimensional ellipse) having the SSR and the observer aircraft 0 at its foci. This difference in distance between R1 and the sum of R2 and R3 is referred to in the preferred embodiment as k (KAPPA). From the SSR database 80, the system of the present invention will further identify the SSR and can therefore determine its rotational sweep rate, either from look-up tables or direct measurement. From this rotational sweep rate and the time of target signal reception (the mode A or mode A and mode C response) the angle $\theta$ (theta) can be determined. The accumulation of the remaining parameters used in the method and system of the preferred embodiment will be discussed hereinafter. However, FIG. 1 will be helpful in further understanding the operation and construction of the system of the present preferred embodiment.

THE PHASE QUADRATURE DIRECTION FINDING ANTENNA AND RECEIVER

Figure 3A:
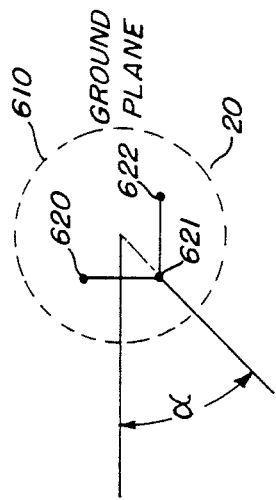
FIGS. 3A, and 3B schematically illustrate the phase quadrature antenna array utilized in the present preferred embodiment and its relationship to the angles alpha and lamda from the aircraft plane AP as illustrated in FIG. 1.
Figure 3B:
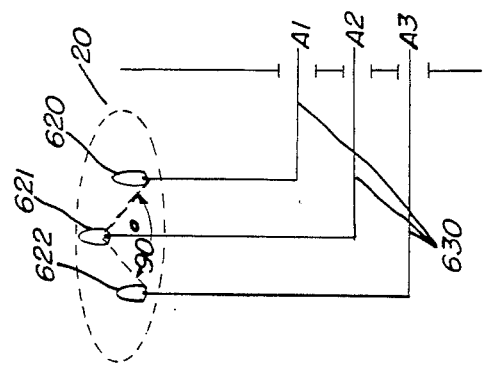
Figure 4:
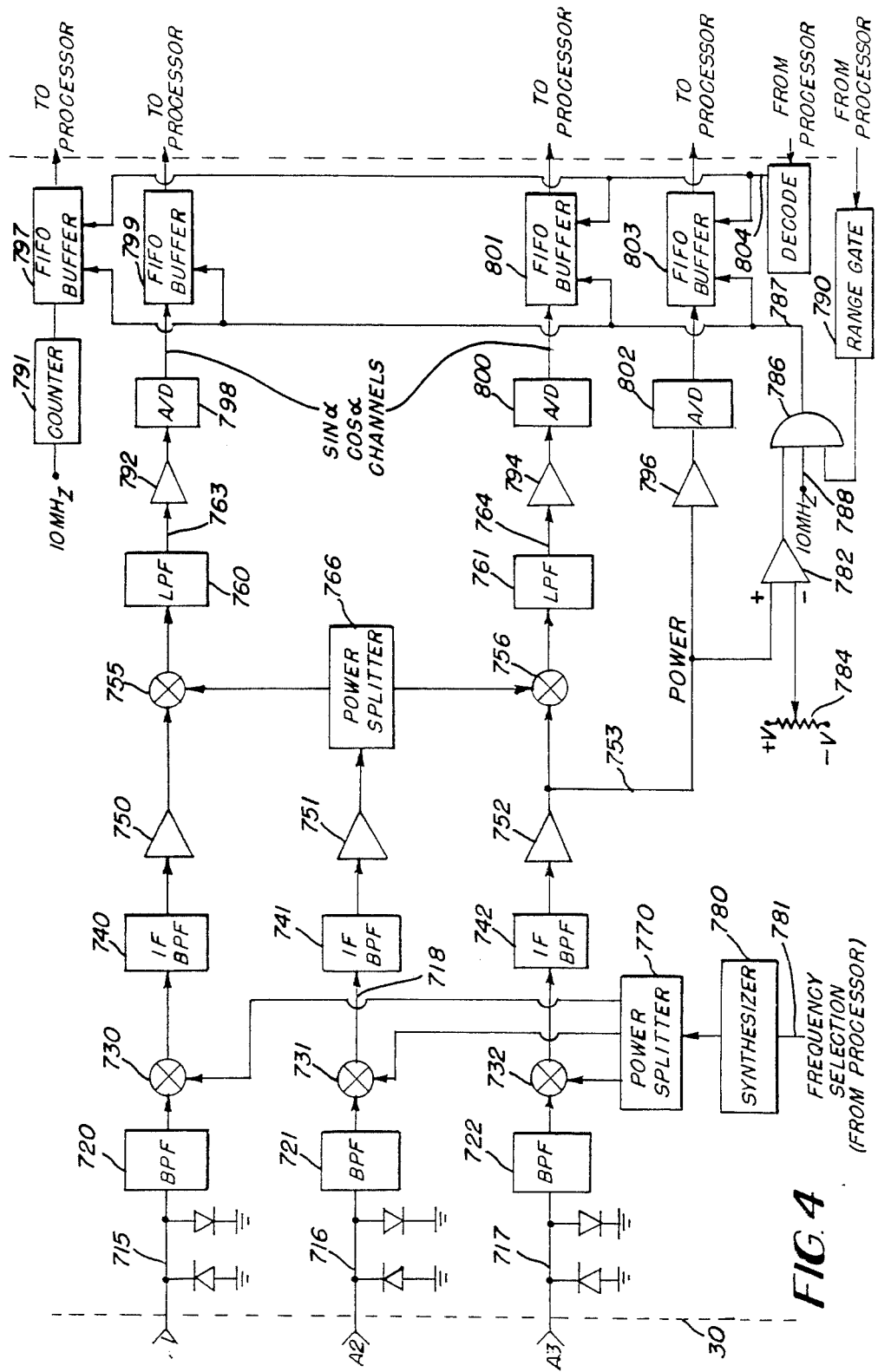
FIG. 4 schematically illustrates the DF receiver 30 and A/D converter and range gate 40 of FIG. 2 in greater detail.

The system of the present invention utilizes a quarter wavelength vertically polarized phase quadrature antenna array as illustrated in FIGS. 3a and 3b. The phase quadrature direction finding antenna comprises an array of three individual quarter wavelength antennae 620, 621, 622 arranged one-quarter wavelength apart in two antenna pairs aligned perpendicularly to each other. These antennae are mounted above a ground plane which is arranged coplanar with the observer aircraft upon which the phase quadrature direction finding antenna is mounted. The ground plane will normally be formed by the uppermost or lowermost surface skin of a portion of the aircraft, the uppermost being the preferred location to reduce the effects of multipath interference.

The three quarter-wavelength antennae 620–622 protrude only two to three inches above the ground plane or aircraft surface and thus do not significantly affect the performance of the aircraft. In the preferred embodiment, the antennae may further be housed in a radio wave transparent housing to further reduce drag and protect the antenna from the elements. While a quarter wavelength quadrature antenna array is utilized in the preferred embodiment, any phase responsive direction finding antenna may be utilized. For example, a quarter or half wave patch antenna such as a microstrip style antenna may be utilized. The phase quadrature direction finding antenna 20 FIGS. 3a, 3b develops first, second, and third antenna outputs A1–A3 from antenna elements 620, 621 and 622, respectively, on output lead 630. The difference in phase between the signal received by quarter wavelength antenna 620 and by quarter wavelength antenna 621 is related to the sine of the azimuth bearing $\alpha$ (alpha) within the plane of the ground plane 610 and the cosine of the elevation bearing $\lambda$ (lamda) measured from the ground plane. Similarly, the phase difference between quarter wavelength antennae 621 and 622 is related to the sine of the azimuth bearing $\alpha$ (alpha) and the cosine of the elevation bearing $\lambda$ (lamda). The outputs of the three individual quarter wavelength antennae 620–622 are provided to the input of the direction finding receiver 30 described in greater detail with respect to FIG. 4. Each received antenna signal is voltage limited by a pair of cross coupled diode clippers 715–717 which serve to limit the voltage supplied to the receiver. These diode clippers 715–717 are particularly necessary to limit received signals from the aircraft's own transponder when interrogated by a ground based SSR. While high amplitude signals such as the signal received from the aircraft's own transponder are limited, these signals may still be received and processed so that, for example, the system of the present invention may process the observer aircraft altitude from the aircraft's own mode C transmission by monitoring it through the direction finding antenna 20.

Each antenna processing channel of the direction finding receiver 30 includes a bandpass filter 720–722 which filters the amplitude limited signal A1–A3 from a respective quarter wavelength antenna 620 to pass only frequencies in the area of interest, which in the preferred embodiment is from 1030 to 1090 megahertz plus or minus five megahertz. The outputs of each of the bandpass filters 720–722 are each provided to an input of a respective high frequency mixer 730, 731, 732. These high frequency mixers 730–732 are provided with a mixing frequency developed by a synthesizer 780 whose output is divided by a power splitter 770. The synthesizer may develop an output having a frequency selected by a signal provided on line 781 from the central processor unit 10, as will be described later.

The 30 MHz signal developed at the output of each of the high frequency mixers 730–732 is supplied to a respective intermediate frequency (IF) bandpass filter 740–742. In the preferred embodiment, the IF bandages filters 740–742 have a bandpass frequency centered on 30 megahertz and have a bandwidth of approximately 8 megahertz to compensate for frequency instability in the received SSR and target aircraft transponder developed signals.

As explained in the Background of the Invention section of the application, the ground-based SSRs transmit their interrogation signals at a frequency of 1030 Mhz while the transmitted Mode A, Mode A and Mode C, or Mode S information from aircraft-based transponders utilize 1090 MHz. Accordingly, during normal operation, the synthesizer frequency is selected via the processor 10 to be 1060 MHz. This will allow input signals received at both 1030 and 1090 MHz to be mixed down to the 30 MHz intermediate frequency (IF) so that both SSR interrogation signals and aircraft based transponder responses may be monitored. However, during initialization, and periodically, if desired to update the optimal constellation of SSRs, the system of the present invention will alter the synthesizer frequency to 1000 MHz to monitor only SSR interrogation signals to locate the SSRs in the area local to the observer aircraft. Additionally, if desired, the synthesizer may be set at 1120 MHz in order to monitor only the aircraft transponder generated responses to the ground based SSR interrogation requests.

The outputs of each of the intermediate frequency bandpass filters 740–742 are supplied to high gain IF amplifiers 750–752 to amplify the IF signals. The DF receiver channel 718 receiving the signal as from centrally located quarter wavelength antenna 621 divides the demodulated signal of the output of amplifier 751 by use of a 3 db power splitter 766 and then provides this split signal to first and second phase detectors 755, 756. The first and second phase detectors 755, 756 further receive as inputs the intermediate frequency mixed down signals on channels A1, A3 from antennae 620, 622, respectively. The outputs of phase detectors 755, 756 are low pass filtered by first and second low pass filters 760, 761 which pass frequencies below 5 MHz and are amplified by amplifiers 792 and 794. (See FIG. 4.) The output of a low pass filter 760 is an output signal related to $\sin \alpha \cdot \cos \lambda$. The output of lowpass frequency 761 is related to $\cos \alpha \cdot \cos \lambda$. Thus, the first and second outputs 763, 764 from the direction-finding receiver 30 are related to the azimuth bearing from the aircraft in relation to its direction of travel to the signal source.

The direction finding receiver 30 further develops an amplitude signal related to the amplitude of the received radio signal. This amplitude signal A is taken from the IF amplifier 752 and is related to the signal strength of the received signal. Outputs related to the sine and cosine of the azimuth bearing and an output related to the signal strength of the received signal are thereby developed by the receiver 30.

A/D Converter, FIFO Buffer and Range Gate

The outputs of the direction-finding receiver 30 are provided to the analog/digital converter and range gate 40 which performs two primary functions.

The system of the present invention, when operated in a crowded environment including a large number of target aircraft is called upon to process large amounts of information. Even though the central processing unit of the preferred embodiment is relatively powerful, it is desirable to avoid introduction of information into the system of the present invention which is unnecessary for the processing of target aircraft which involve potential or actual threats. Therefore, it is desirable to inhibit input signals from the direction finding antenna 20 and receiver 30 which are generated by aircraft which pose no collision danger. Accordingly, the system of the present invention inhibits the analog/digital conversion of the outputs from the direction finding receiver whenever these signals pose no possible collision threat. This is performed in two manners.

Firstly, a "soft" range threshold is provided by inhibiting the analog to digital conversion of any signal having an amplitude of less than a predetermined level. In the preferred embodiment, the amplitude related signal attained from the intermediate frequency amplifier 752 on line 753 is monitored and compared to a voltage threshold developed by a potentiometer 784 in a comparator 782. In the preferred embodiment, the potentiometer 784 is adjusted so that only signals having a received amplitude greater than $-72$ dbm will be converted by the A/D converter and range gate 40. This level prevents distant transponder signals from being processed by the A/D converter and range gate and further limits the noise power spectrum. With this $-72$ dbm minimum detectable level, target aircraft transponders more than 10 miles distant may not be detected by the system of the present application. However, as no possible collision threat is created by these aircraft, the monitoring of these aircraft is unnecessary.

The analog to digital conversion of the outputs of the DF receiver 30 by the A/D converter and range gate 40 is further limited to signals received within 150 microseconds after the receipt, by the observer aircraft 0, of an SSR interrogation signal. Thus, when the difference between R1 and the sum of R2 and R3 of FIG. 1 is sufficiently great so that the signal from the target aircraft T is not received within 150 microseconds of the receipt of the transponder interrogation signal from the SSR, the analog to digital conversion of that signal is inhibited.

Each of the outputs of the DF receiver 30 on line 763, 764 and 753 are supplied to a respective amplifier 792, 794, 796 which normalizes these output signals into signals having a maximum voltage range of $+/-1$ volt. The analog outputs of these amplifiers 792, 794, 796 are supplied to first, second, and third analog/digital flash converters 798, 800, 802. The digital outputs of these converters 798, 800, 802 are additionally provided to first, second and third FIFO Buffer memories which are, in the preferred embodiment, 1024 by 8 bit memories: volt range of the output of each respective amplifier 792, 794 and 796 is digitalized by a respective analog/digital converter 798, 800, 802. The outputs of A/D converters 798, 800, 802 are in turn applied to the FIFO buffer memories 799, 801, 803. The FIFO buffer memories 799, 801, 803 are clocked by a 10 MHz clock signal provided on line 788 and derived from the system clock of the central processing unit 10. Under normal operation, this clock signal is provided to the FIFO buffers to control the introduction of information into these buffers. However, the 10 MHZ clock on line 788 is gated by AND gate 786 to provide the gated clock signal on line 787 for supply to the FIFO buffer memories 799, 801, 803. The AND gate 786 controls the passage of the 10 MHZ clock through application of two other inputs. The first input, the output of the amplitude gating comparator 782 is developed as long as the received voltage level is greater than $-72$ dbm. The second input from the range gate 790 is developed as long as the received signal is received within 150 milliseconds of observer aircraft reception of the SSR signal. Thus, only signals having a voltage level greater than $-72$ dbm and received within 150 microseconds of the SSR signal are introduced into the respective FIFO buffers 799, 801 and 803.

The digital information stored in the FIFO buffer memories 799, 801, 803 is provided to the central processing unit whenever a decode command from the central processing unit is received on line 804. Thus, the FIFO buffer memories 799, 801, 803 further act as a buffer for the input of SSR ground station and aircraft transponder response information from the central processing unit 10.

The FIFO buffers 799, 801, 803 accumulate the output of the direction finding receiver 30. The FIFO buffer memories 799, 801, 803 also accumulate the outputs of the direction finding receiver which represent SSR ground stations as the central processing unit keeps track of the time at which these ground stations should be received from past signal receptions and/or from look-up tables containing known rates. During this time, the range gate 790 does not inhibit the conversion of the outputs of the direction finding receiver 30. The A/D converter, FIFO buffer and range gate further includes a counter 791 which receives the 10 MHz clock frequency used to clock the FIFO buffers 799, 801 and 803. This counter is self-resetting periodically and will accumulate counts representative of times greater than the maximum time differences which need be detected by the system. Thus, the counter 791 is reset less frequently than the 150 millisecond window developed by the range gate 790 described below. The output of the counter 791 is supplied to an additional FIFO buffer memory 797 which stores the output of the counter 791 which is representative of the time at which information in the FIFO buffer memories 799, 801 and 803 is accumulated. The FIFO buffer memory 797 is clocked by the same 10 MHz clock signal provided on line 788 and the output from this FIFO buffer memory 797 is controlled by the decode command from the central processing unit on line 804 in synchronism with the input and output of information from the other FIFO buffer memories 799, 801 and 803. Accordingly, for each value of sin (alpha) cos (lamda) as digitally stored in the FIFO buffer 799, cos (alpha) cos (lamda) as digitally stored in FIFO buffer 801, and amplitude as digitally stored in FIFO buffer 803, an unambiguous count representative of the time of receipt of this information is also transferred to the central processing unit. This unambiguous time of receipt of each information item is used to determine signal timing and decode signal content as well as determining TDOA information.

The range gate 790 of the present invention is, in the preferred embodiment, a pair of timer-controlled latches responsive to the system clock. The first latch is set at the expected time of receiving the directional sweep signal from the secondary surveillance radar SSR as determined by antenna processor 14 and processor timer 18 described herein. This latch causes the range gate 790 to develop a high at its output. A second latch is set 150 microseconds later and drives the output of the range gate 790 low to disable receipt of the incoming signal. Thus, a high output is developed upon receipt of a signal from the central processing unit 10 indicating that an SSR interrogation along with associated transponder replies should be received. The output from the microprocessor prevents the range gate 790 from producing a logical low output, thereby inhibitinq the application of the clock signal to the analog/digital converters on line 787 for the 150 μs gating period.

While the above mentioned range gating is used in the preferred embodiment, other methodology for eliminating the tracking of unnecessary aircraft may be utilized. For example, signals emanating from all Mode A and Mode C-equipped aircraft outside an altitude range of interest may be ignored at this point so as to reduce signal computation.

System Initialization

Figure 5:
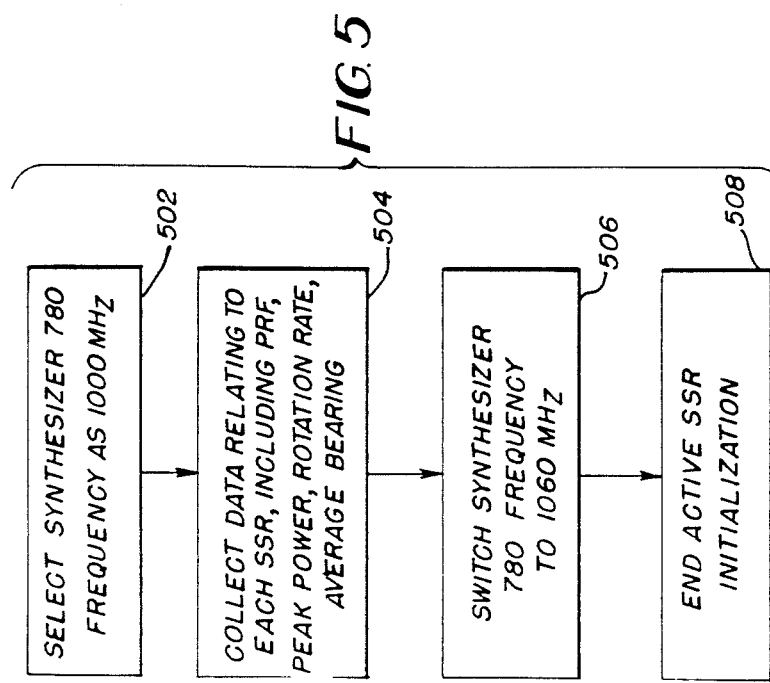
FIG. 5 is a flow chart illustrating the SSR search routine utilized during system initialization in the system of the present preferred embodiment.

To initialize the system, the pilot of the observer aircraft enters, via the pilot input 90, initialization information such as the latitude and longitude of the airport of origination as well as the aircraft's altitude. The central processor unit then implements an SSR search routine shown in FIG. 5. To initialize a list of active SSRs to be monitored, the initial SSR search routine causes the synthesizer 780 to select a 1000 MHz frequency in step 502. The central processor unit therefore only receives digital information from SSRs within line-of-sight of the observer. The CPU therefore collects data related to each SSR including the SSRs average bearing μ (mu), peak signal strength received and SSR rotation rate. This information is then utilized to construct a pattern vector which enables the identification of each SSR based upon knowledge of the plane's present position, and the SSR's characteristics as attained from the SSR database 80. After this step (504) is implemented, and each local SSR has been identified and placed in an active list, the synthesizer 780 is switched automatically via CPU 10 to 1060 MHz to allow receipt of both SSR interrogation signals and transponder responses as shown in step 506. The system then ends the active SSR initialization process and begins monitoring of target aircraft positions. Periodically, and coincident with the state-space coordinate frame translations described herein, the initialization procedure summarized above is revisited to update the working constellation of SSRs.

The current SSR list (CSL) contains all SSRs within a certain radius (nominally 700 n miles) of the coordinate system. This list is maintained as a sorted list, sorted by the distance of the CSL SSRs from the coordinate system center. The active SSR list (ASR) is a sublist of the CSL list. When an SSR signal is processed, it is matched with a specific SSR in the CSL on the basis of pulse repetition rate, signal strength, and azimuth angle from the observer aircraft in that order.

Construction of Input Information Data Packets

Figure 6:
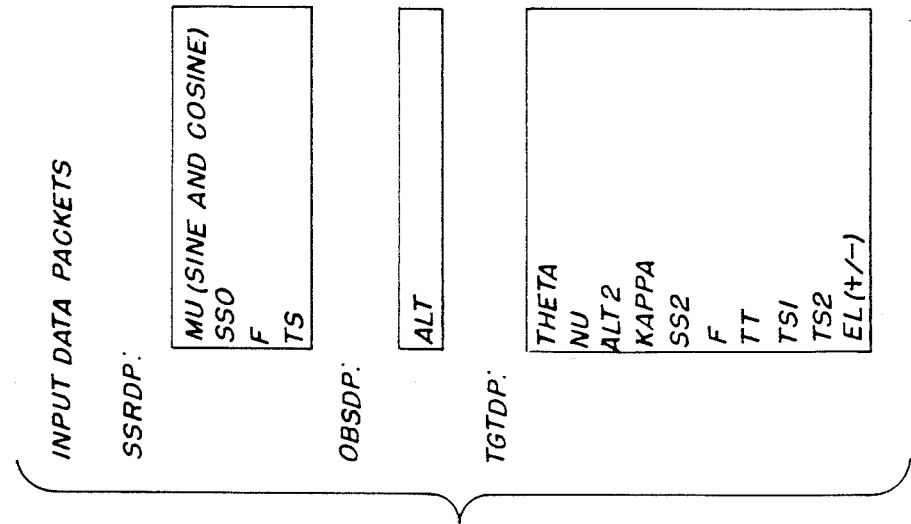
FIG. 6 is an illustration of the SSR observer and target aircraft data packets utilized in the present preferred embodiment.

The system of the preferred embodiment accumulates information from the direction finding antenna, 20, and direction finding receiver, 30, altimeter 50, and attitude processor such as flux gate magnetometer and rate sensor 70, and the SSR database 80 as well as from the CPU's internal clock to form data packets used to determine target and observer aircraft positions. An SSR data packet, SSRDP, observer aircraft data packet, OBSDP, and target aircraft data packet, TGTDP, take, in the preferred embodiment, the form illustrated in FIG. 6.

The SSR data packet includes a digital representation of: μ (mu) including its sine and cosine to provide the direction along R1 of FIG. 1 from the observer aircraft to the SSR; SSR0, the received SSR signal strength; F, the direction cosine matrix defining the attitude of the observer aircraft with respect to a tangent to the horizon which will be discussed hereinbelow with reference to the attitude processor; and TS, the time of the omnidirection signal reception at the observer aircraft. An SSR data packet SSRDP is assembled for each of the active SSRs under consideration by the central processing unit CPU 10.

The observer aircraft data packet OBSDP simply includes the altitude of the observer aircraft ALT which may be derived either from the altimeter or from the transponder generated response to an SSR mode C interrogation.

A target data packet TGTDP is generated for each target aircraft under consideration. In the preferred embodiment, up to 127 target aircraft may be simultaneously monitored. The target aircraft data packet TGTDP includes: $\theta$ (theta) which is the angle defined by the sweep of the SSR beam from the observer to the target aircraft; $\nu$ (nu) which is the total angle from the observer aircraft to the target aircraft; ALT2, the altitude of the target aircraft from the target aircraft's response to a mode C interrogation, if present; k (KAPPA), a distance derived from the TDOA which is the difference in distance between R1 and the sum of R2 and R3; SS2, the signal strength of the response received from the target aircraft; F, the direction cosine attitude matrix of the observer aircraft; TT, the time of the target signal reception by the observer aircraft; TS1, the last time the relevant SSR main beam was observed by the observer aircraft; and TS2, the time previous to the last time that the SSR main beam was observed by the observer aircraft. The target data packet TGTDP may also include a spare parameter to be utilized later, when desired.

Figure 7:
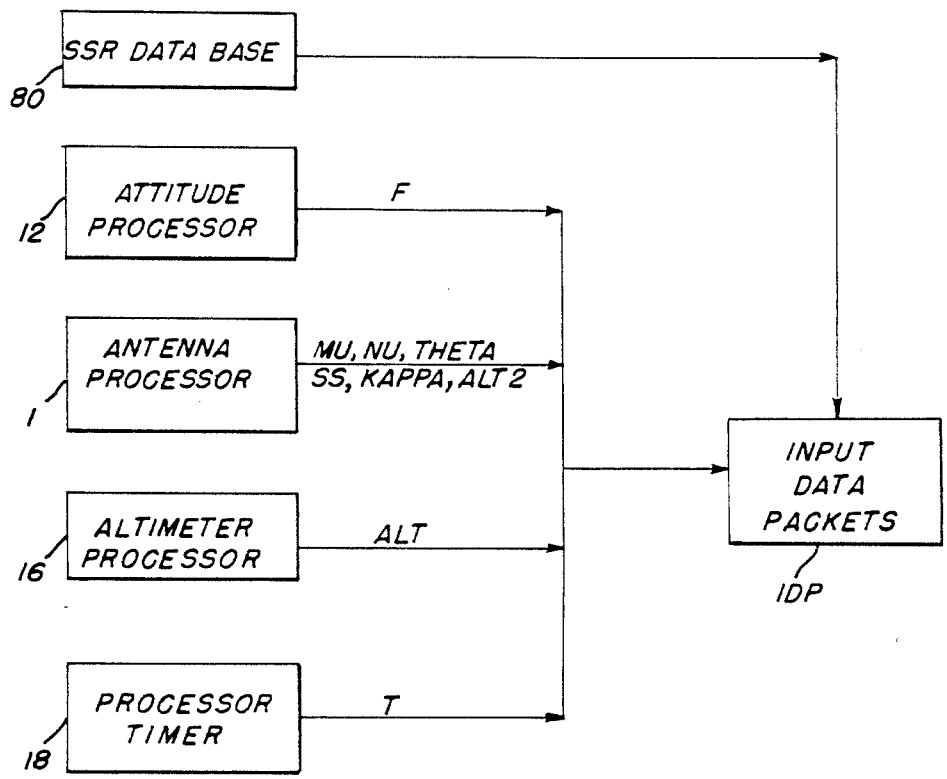
FIG. 7 schematically illustrates the processors utilized to construct the input data packets IDP as illustrated in FIG. 6.

The input data packets (IDP) are derived from the input processors generally illustrated in FIG. 2. Data from each input is processed by a respective processor as illustrated in FIG. 7. The IDP are then stored in the system memory for use by the state space processor as will be described hereinbelow.

The elements of the SSR data packet SSRDP are derived in the following manner. $\mu$ (mu) which is recorded by its sine and cosine is derived directly from the digitally encoded outputs of A/D flash converters 798, 800 which output a digital representation of sin $\alpha$. cos $\lambda$ and cos $\alpha$. cos $\lambda$, respectively. An antenna processor 14 receives these A/D converted signals and when the signals are identified as from an SSR, the $\mu$ data is stored for that SSR. Similarly, the antenna processor 14 derives SS0, the received signal strength of the SSR, from the output of A/D converter 802 which is a digital representation of A, the logrithmic power of the received signal.

F, the direction cosine matrix of the observer aircraft utilized in the SSR data packet SSRDP is developed by an attitude processor 12. This attitude processor 12 is responsive to the flux gate magnetometer and rate sensors 70 of FIG. 2 which provides information related to the pitch and roll of the observer aircraft. From this information, the attitude processor computes the direction cosine matrix including Fl, a unit vector pointing towards the nose of the aircraft; F2, a unit vector pointing out the left wing of the aircraft; and F3, a unit vector pointing out the top of the cockpit. Thus, F3 is orthogonal to the plane of the observer aircraft. The attitude processor 12 may receive its necessary information from any attitude or attitude-rate feedback instrumentation, such as accelerometers, gyros, etc., or directly from the observer aircraft digitized flight instrumentation such as artificial horizon and compass, if available, which will deliver feedback for a direction cosine matrix. This will be further discussed hereinbelow with reference to the attitude processor. With such a rate gyro type system, the attitude processor is also provided with $\mu$ from the antenna processor to one or more SSRs having known positions so that a north direction vector may be determined.

Finally, the SSR data packet includes the time of omni signal reception TS obtained from the system clock or processor timer 18 at a time at which the antenna processor 14 signals detection of the omni signal from that SSR.

An SSR data packet is accumulated for as many as three SSRs monitored by the system of the present invention. These SSRs are selected optimally on the basis of signal strength and also are selected so that the mu data for each SSR differs significantly from the other SSRs being monitored so that proper triangulation can be performed.

The observer aircraft data packet OBSDP consists of the observer aircraft's altitude which is normally provided directly from the aircraft altimeter. An altimeter processor 16 digitally encodes this altitude information for inclusion in the data packet. Alternatively, altitude information from a mode A and a mode C transponder carrying observer aircraft may be obtained from the observer aircraft's mode C response to an SSR interrogation processed by the antenna processor. However, in the primary preferred embodiment, altimeter processor 16 derives this information directly from the observer aircraft's altimeter.

A target aircraft data packet TGTDP is developed for each monitored target aircraft. The respective data elements of the target aircraft data packet TGTDP are derived as follows. $\theta$ (Theta), the observer-SSR-target aircraft angle is derived from the SSR rotational sweep rate provided to the antenna processor from the direct-measurement and SSR database 80 and from the difference between the time of target signal reception TT and the time of main beam signal reception TM. The time of main beam signal reception is determined by the antenna processor in conjunction with the processor timer 18 as is the time of target signal reception. This difference determines the angular portion of the SSR main beam sweep when the SR rotational sweep rate is known. Thus, $\theta$ (theta) is acquired by the antenna processor 14.

$\nu$ (Nu) is determined by the antenna processor 14 in a manner identical to the determination of $\mu$ (mu). $\nu$ (Nu) is determined by direction finding on the transponder response of the target aircraft to an SSR interrogation signal.

ALT2, the altitude of the target aircraft, is decoded by the antenna processor from the mode C response of the target aircraft. If the target aircraft is not provided with a mode C transponder, then this data is not included in the data packet.

k (KAPPA), the distance between R1 and the sum of R2 and R3 is derived from the time delay of arrival TDOA and is calculated by subtracting the delay in a target aircraft's generation of a response after receipt of the interrogation signal from the time difference of arrival of the target aircraft's response and the SSR's interrogation signal and multiplying this difference by C, the speed of light. KAPPA is thus derived by the antenna processor 14.

SS2, the target aircraft signal strength, is derived by the antenna processor 14 in a manner similar to the determination of the SSR signal strength SS zero.

F is again the direction cosine attitude matrix of the observer aircraft calculated by the attitude processor 12. TT is the time of target signal reception calculated by the processor timer 18 in cooperation with the antenna processor 14, TS1 is the last time the relevant main beam was observed and TS2 is the time previous to the last time that the SSR main beam was observed. Both TS1 and TS2 are determined by the processor timer 18 in cooperation with the antenna processor 14.

Input Data Packets

The elevation with respect to the aircraft plane AP to the target aircraft is denoted ±EL. EL is a digital value representative of the angle lamda of FIG. 3(b) and is determined from cos (lamda) of the outputs of FIFO buffer memories 798,800. This is easily determined as the amplitude A developed at the output of the FIFO buffer memory 802 is not variable with respect to cos (lamda) while the sin (alpha) and cos (alpha) outputs from FIFO buffer memories 798,800 are. While the angle lamda represented by the information ±EL will typically be small, and thus significant errors may occur, this angle is probative of the position of the target aircraft and is therefore included in the target data packet TGTDP.

The Attitude Processor

The attitude processor 12 of FIG. 7 receives input voltages proportional to the angular rate of the aircraft in the a, b and c axes of the aircraft where the a axis describes the axis from nose to tail of the aircraft in the aircraft plane AP, c describes the axis extending out the left wing of the aircraft in the aircraft plane AP and b is a vector extending out the top of the aircraft perpendicular to the aircraft plane AP.

The feedback instruments of the attitude processor, in the preferred embodiment a triplet of angular rate sensors, provide input voltages proportional to the angular of rate along the a, b and c axes. These rate signals are analog to digital converted by the attitude processor 12 in a manner well known in the art and are supplied to a matrix (capital omega) where:

$$\Omega_{t+1} = \begin{vmatrix} 0 & P & Q \\ -P & 0 & -R \\ -Q & +R & 0 \end{vmatrix}$$

In operation, the attitude processor first initializes the direction cosine matrix as follows:

$$F_t = \begin{vmatrix} 1 & 0 & 0 \\ 0 & 1 & 0 \\ 0 & 0 & 1 \end{vmatrix}$$

This occurs in step 520 of FIG. 17. In operation, the direction cosine matrix is updated in step 524. The Direction Cosine matrix is updated by first computing the direction cosine matrix rate:

$$F_{t+1} = F_t + \Omega_{t+1}$$

The direction cosine matrix rate is integrated via the Euler method or another fast computation to obtain the direction cosine matrix at time t+1 using the equation:

$$F_{t+1} = F_t + \overset{\circ}{F}_{t+1} Dt$$

The program then returns to step 522 via path 526. Accordingly, the monitoring of angular rate information 522 and the updating of the direction cosine matrix 524 are performed repetitively to maintain an accurate direction cosine matrix.

The Direction Cosine Matrix F is then provided to update the data packets as described above.

The Antenna Processor

The antenna processor 14 of FIG. 7 decodes the information received by the CPU 10 from the FIFO buffer memories 797, 799, 801 and 803 to derive information descriptive of the SSR interrogation pulses and the target aircraft transponder response thereto. This decoding is performed in a manner known in the art in the same manner as signal decoding is performed in the receiver of the secondary surveillance radar of the ATCRBS. Thus, the manner of processing the data received from the receiver of FIG. 4 to recognize SSR interrogation signals and corresponding responses and decode the altitude information from the Mode C responses is well known in the art. The remaining information developed by antenna processor 14 is obtained in a manner already described in the present specification.

Altimeter Processor

The altimeter processor simply receives the output of the aircraft altimeter and digitalizes this output for accumulation in the input data packets IDP.

State Space Processing

The input data packets are utilized by a state space processor within the CPU 10 as will be described hereinbelow with respect to FIGS. 8-14. The state space processor determines the relative positions of the monitored SSRs, observer aircraft and target aircraft based upon updated data within the SSR data packet SSRDP, observer data packet OBSDP, and target data packet TGTDP, as well as based upon prior estimates of relative positions and prior knowledge of each of the relevant data values. The state space processor determines the relative position and velocity of the observer aircraft and target aircraft and estimates the magnitude of error in those estimates. Kalman filtering techniques are used to propagate forward past estimates so that the present position calculations are based in part on past position calculations. This allows a higher degree of system accuracy through the filtering of noise contained within the current estimates. Further, the state space processor allows the position estimates to flywheel through singular geometries, thus avoiding inaccurate and inconsistent position estimates.

Figure 8:
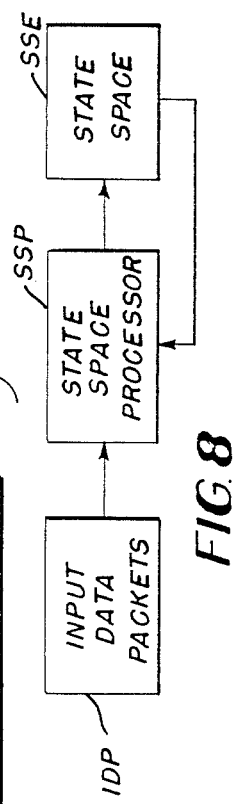
FIG. 8 schematically illustrates the operation of the state space processor to update state space.

As illustrated in FIG. 8, the input data packets are used by the state space processor of the present invention to calculate state space estimates including the relative position and velocity of each of the target aircraft and of the observer aircraft relative to the monitored SSRs. The state space estimates are used by the state space processor to prepare revised state space estimates. The relative positions and velocities in state space SSE are then used to determine the actual positions and velocities of the observer and target aircraft as well as the monitored SSRs based upon earth's fixed coordinates as will be described hereinbelow.

Details of the algorithms utilized by the state space processor as described hereinbelow are described in further detail in the attached appendix which is a pseudo code representation of the programming utilized in the present preferred embodiment.

The position of each target in state space SSE is calculated by the state space processor SSP based upon the most useful parameters in the data packets. Normally, the position of the target is updated from $\theta$, $v$ and the target's altitude ALT2. This will be described in greater detail with reference to FIG. 12. If only one of $\theta$, $v$ or ALT2 is missing, then the processor utilizes KAPPA in the place of the missing parameter. Normally $\theta$ and $v$ would be present and the altitude ALT2 would be missing in such a case as only approximately 40% of the currently registered aircraft include a working mode C altitude transponder to provide the altitude information ALT2.

In the event only one of $\theta$ or $v$ or ALT2 is present, then KAPPA and SS2 are used to supplement the missing information.

When the target is between the observer and the interrogating SSR, then $\theta$ and $v$ will be redundant as $\theta$ will be zero and $\mu$ and $v$ will be equal. Accordingly, KAPPA and SS2 are utilized to determine target position.

When the observer aircraft is in a vertical climb or dive, then ALT2 and $v$ are redundant. In this case, KAPPA and SS2 are used to update target position.

Figure 13:
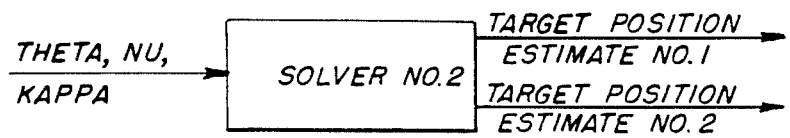

When ALT2 data is not present, KAPPA based upon the TDOA will always be used to determine target positions as illustrated in FIG. 13. Accordingly, two solutions will normally be present. When such two solutions are present, the solution which is closest to the observer aircraft will be used. The range of the observer from the SSR is normally updated from KAPPA.

The observer data packet is continuously updated by updating the altitude of the observer aircraft. The SSR data packet is also processed to update the position of the observer aircraft with respect to the SSR. The position of the observer aircraft is determined from the DF bearing to the SSR ($\mu$), and the magnetometer-sensed direction to north N. The range from the SSR is calculated from SSR signal strength and thus the relative position of the observer aircraft is estimated.

Important to the operation of the state space processor is the employment of Kalman filtering techniques as will be explained in greater detail in FIGS. 10-11. Kalman filtering smooths position changes to estimate aircraft velocities and estimates aircraft positions based upon their past positions propagated forward in time. Kalman filtering optimally combines current and past position and velocity estimates to obtain smoothed estimates of these states. Covariance matrices contain estimates of errors existent in each of the data values utilized to calculate estimated position and velocity of the observer and target aircrafts and propagate these estimates forward in time. The covariance matrix contains estimates of the RMS values of errors as well as the cross correlations of these errors.

It should be noted that the data packets assembled for use in computations performed by the state space processor include a data packet for each SSR being monitored and a data packet for each target aircraft, monitored SSR combination. Thus, if three SSRs are interrogating a target, three target data packets for that single target will be utilized.

Observer aircraft position is primarily determined from triangulation of this position based upon the presence of more than one SSR. The angle mu to each SSR is used to triangulate the observer aircraft position. If only one SSR is observable, and when a single target aircraft also is visible and has a mode C capable transponder, the position of the observer aircraft is primarily determined from KAPPA. If there is only one SSR and the target(s) do not have a mode C encoding altimeter, the observer position is determined by the SSR angle mu and the SSR signal strength. If available, a digital link to a flight compass will also be used to provide north. However, its use is not required for the operation of the preferred embodiment.

Figure 12:
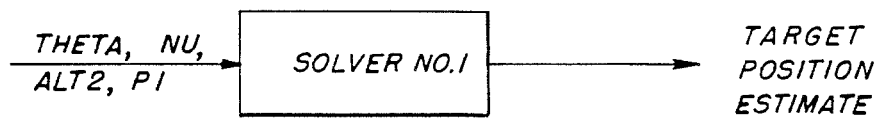
FIGS. 12 and 13 illustrate the operation of the SOLVER 1 and SOLVER 2 subroutines to determine target position estimates based upon input data.
Figures 14, 15:
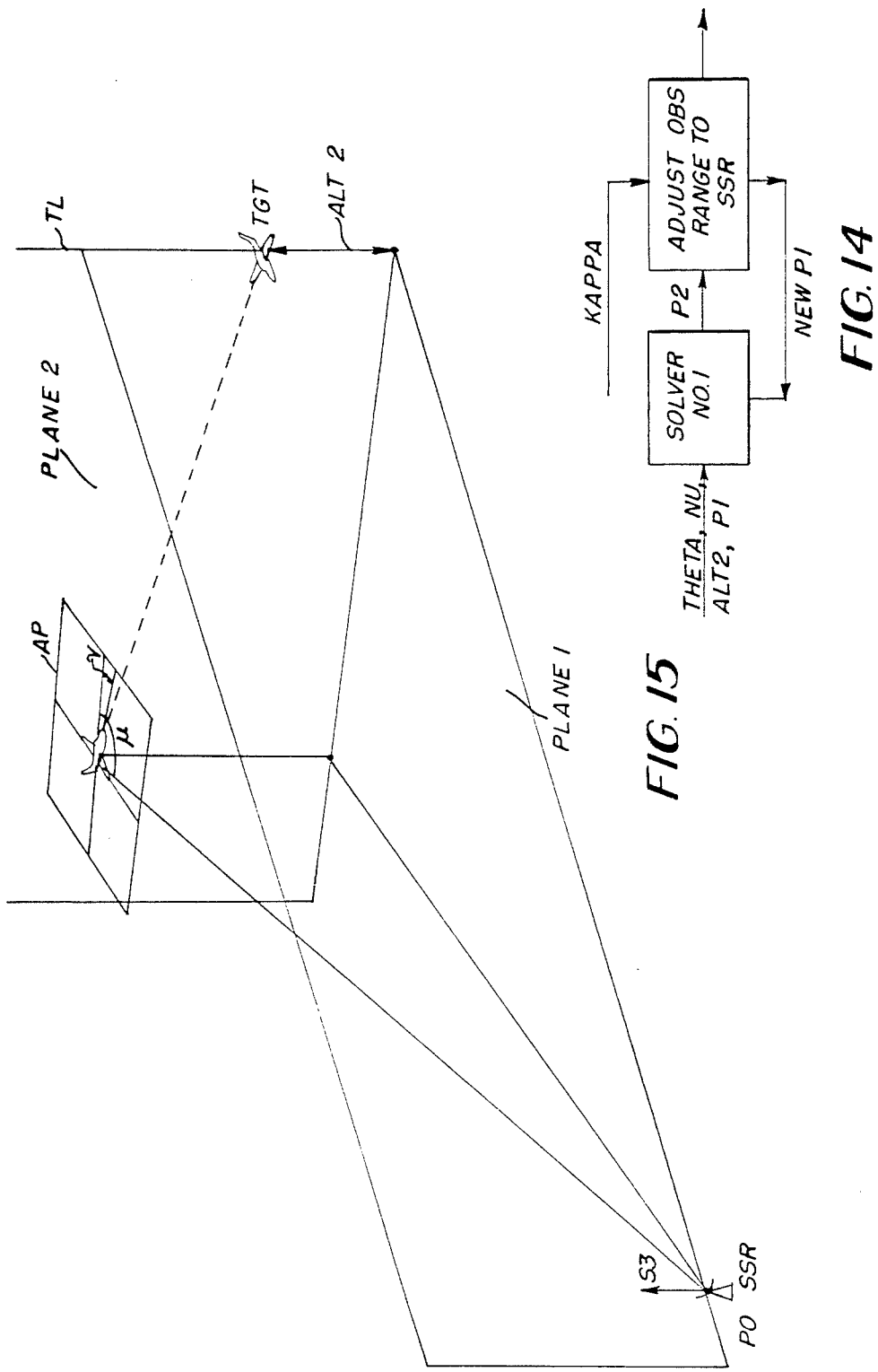
FIG. 14 illustrates an algorithm used to determine the position of the observer aircraft when only a single SSR is available.
FIG. 15 is a geometrical illustration of the operation of the SOLVER 1 algorithm.

To determine the position of a target aircraft having the data ALT2, the SOLVER 1 routine of FIG. 12 described in the pseudocode program of the attached appendix is utilized to determine the target aircraft position from the observer aircraft position, $\theta$ and $v$ and ALT2. This is performed by first defining two planes as best shown in FIG. 15. The first plane contains the observer aircraft and the target aircraft and is orthogonal to the plane of the observer aircraft. (The vector b (FIG. 1) is parallel to the first plane.) This plane is computed from $v$, F3, the vector orthogonal to the plane of the observer aircraft and P1. A second plane is next computed which contains the SSR and the target aircraft and which is orthogonal to the plane of the SSR. (The vector S3 is parallel to this plane.) The SSR plane is defined as the plane orthogonal to the axis of rotation of the SSR sweep beam. This second plane is computed from $\theta$, P0, the SSR position, and S3, the axis of rotation vector of the SSR which is held in the SSR data base. The intersection of the first and second planes described above creates a line TL containing the target aircraft. The altitude of the target aircraft ALT2 and this line are used to locate the target. When the angle between the first and second planes described above is too small, then the target aircraft lies between the SSR and the observer. Such an acute angle multiplies potential errors and thus this form of computation is aborted by the algorithm. The line described by the two planes is normally vertical as the second plane is orthogonal to the plane of the SSR and the first plane is orthogonal to the lane of the observer aircraft. However, if the line described by the two planes is close to horizontal, then the observer aircraft is flying straight up or down or is sharply banked and thus position cannot be accurately determined from the intersection of the line and altitude. Therefore the operation of this SOLVER 1 algorithm is also suspended, and the algorithm flywheels through this geometric singularity.

Figure 16:
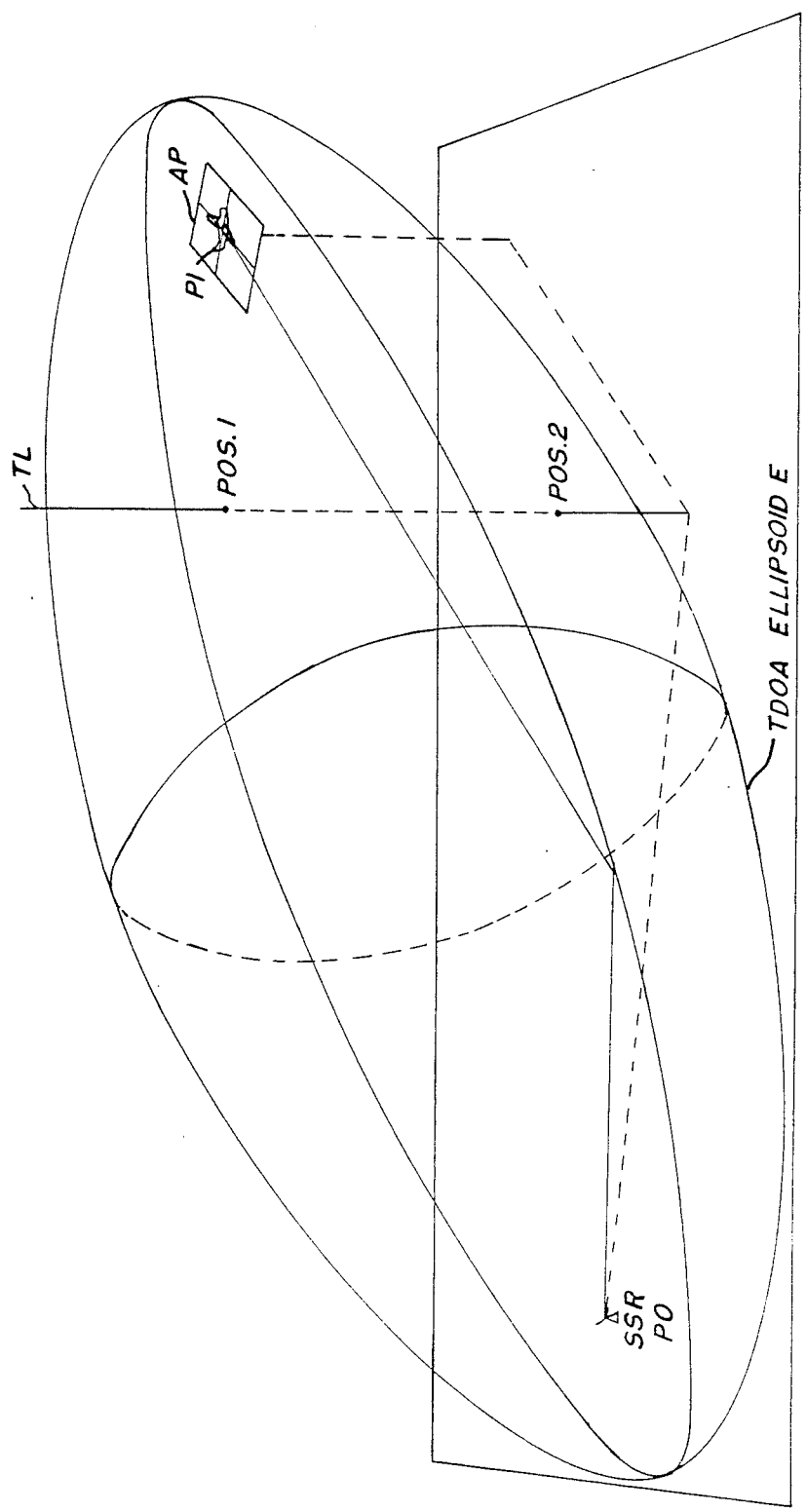
FIG. 16 is a geometrical illustration of the operation of the SOLVER 2 algorithm.

Subroutine SOLVER 2, illustrated in FIG. 13 and described in greater detail in the pseudocode program of the attached appendix, determines target position when the target aircraft altitude ALT2 is not available. The geometric principle utilized in this SOLVER 2 routine are illustrated in FIG. 16. The calculation of the time difference of arrival TDOA between receipt of the SSR main beam and receipt of a target aircraft transponder response. From this TDOA, as described hereinabove, KAPPA, the difference between R1 and the sum of R2 and R3 is determined. This value KAPPA describes an ellipsoid E having foci centered at the SSR (P0) and the observer (P1). The vector P1-P0 is the axis of revolution of this ellipsoid. Just as in the case where the target altitude ALT2 is present, a line is formed by the intersection of first and second planes defined by $\theta$ and $v$. The target aircraft must lie on this line. Again, this line is normally near vertical. The line intersects the ellipsoid at two points and thus two possible solutions exist for the case in which no target altitude ALT2 is available. Both solutions usually have about the same elevation above and below the plane of the observer aircraft and about the same range from the observer aircraft. Because none of the other values available for calculation of target aircraft position clearly discriminate between these two values, it is impossible, based solely upon present states, to determine which of these values is the location of the target aircraft. Accordingly, the system of the present application maintains both of these values as if they were correct unless one is determined to be incorrect based upon past values of the target aircraft or until one of the two values diverges over time until it is clear it is erroneous.

When only a single SSR is available, the position of the observer aircraft is defined in one dimension by the angle $\mu$ to the SSR. This is illustrated in FIG. 14 and described in greater detail in the attached appendix. However, the range of the observer aircraft from the SSR must be determined using other independent parameters. KAPPA, the difference in distance between R1 and the sum of R2 and R3 and related to TDOA is used in the event that only one SSR is being monitored. However, if Kappa is less than twice the difference in altitudes between the target aircraft and observer aircraft this computation must be abandoned as inaccurate.

To determine the observer aircraft position based upon Kappa, the positions of at least one target aircraft, the observer aircraft and the SSR are transformed to put P0 at the origin of a temporary state space. Because of the lack of a calculated position P1, the position of the target aircraft is known only with respect to ALT2 and the relative angles $\nu$ and $\theta$. Because the position of the target aircraft in this situation is dependent upon the assumed position of the observer aircraft, the computed value of KAPPA based upon positions P1 and P2 will sometimes differ from the actual value of KAPPA. The computed value of KAPPA is calculated to develop a scaling factor X to rescale the position estimates of P1 and P2. The computed value of KAPPA is iteratively calculated until the computed value of KAPPA is close to the measured value of KAPPA thus establishing that P1 and P2 are accurate This is done by the following formula

| | | |
|---|---|---|
| KAPPAC | = | [P2] = [P2 − P1] − [P1] |
| X | = | KAPPA/KAPPAC |
| P1(1) | − | X * P1(1) |
| P1(2) | − | X * P1(2) |
| RECOMPUTE P2 FROM THETA, NU, AND ALT2 | | |

Upon completion of this iteration such that KAPPA calculated and KAPPA are substantially equivalent, the values of P1 and P2 are established and the state space is transformed to return the origin to the point near the observer aircraft. The above mentioned algorithm is monitonically increasing for cases where KAPPA is greater than twice the altitude difference of the target and observer aircraft. However, when KAPPA is less than twice the altitude difference, two solutions are developed. Thus, the TDOA type data relying on KAPPA cannot be used in such a situation where KAPPA is less than twice ALT2-ALT. The above mentioned algorithm converts the positions P0-P2 into a state space wherein P0 is at the origin in order to avoid repeated computation of P1-P0 and P2-P0.

The Use of Kalman Filtering

The system of the present invention seeks to optimally estimate the current positions and velocities of the observer and target aircrafts based upon previous states of these values and upon updated data. The system of the present invention utilizes Kalman filtering as an optical estimation technique. Through the use of Kalman filtering, more accurate data is weighed more heavily than less accurate data. Kalman filtering further allows the system of the present invention to estimate observer and target aircraft positions during times of insufficient data or singular geometries through a flywheel effect created by reliance on past states. Singular geometries may also be accounted for. The use of optimal Kalman filtering techniques further provides a convenient means for interpolating between related input data sets processed separately even though interrelated. For example, the triangulation of the observer position from the angles mu from various SSRs may be performed although data from the different SSRs arrives at different times. The system of the present invention has a least squares emphasis on large residuals which helps maintain positional accuracy when several SSRs are on one side while only one is on the second side of the observer aircraft.

Figure 9:
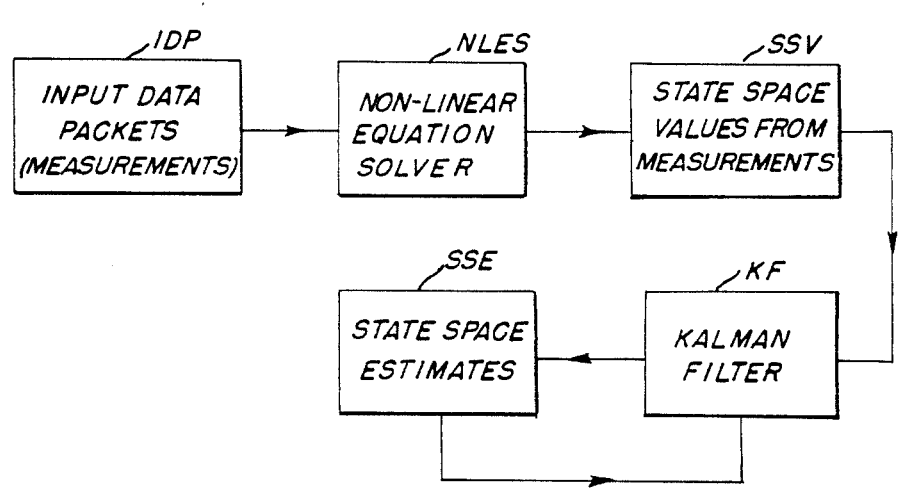
FIG. 9 schematically illustrates the operation of the state space processor in greater detail.

As illustrated in FIG. 9, the state space processor receives input data packages IDP prepared as described above and using nonlinear vector equations in a nonlinear equation solver NLES, obtains state space values SSV from the measurements. These state space values define the position and velocity estimates of observer and target aircraft position based upon present measurements. Kalman filtering is then performed to prepare new state space estimates SSE based upon the state space estimates previously derived and the state space values SSV newly developed from measurement data. The techniques of Kalman filtering are well known and are described in detail, for example in Applied Optimal Estimation edited by Arthur Gelb, the M.I.T Press, 1974. The system of the present application utilizes an improvement over such well known Kalman filtering techniques which will be later described.

The system of the present invention solves all nonlinear equations prior to Kalman filtering in order to increase the accuracy of the nonlinear solutions and to simplify the interpretation of filter performance. By transforming the input data packets into state space values prior to Kalman filtering, an identity matrix may be used for the H matrix in the Kalman filter. Thus, matrix multiplications are reduced and the software may be more readily modularized. The Kalman filtering techniques of the present invention described in greater detail in the attached Appendix are further simplified by ignoring most cross correlations terms between the observer and target aircraft state estimates to minimize processing time. Heuristic predictions are used to compensate for the elimination of such cross correlations. An adaptive Kalman filter is utilized in the present application and described in greater detail with respect to FIG. 11 herein. The adaptive Kalman filter allows the state estimation to better track turning aircraft and further reduces filter divergence. Adaptive filtering also compensates for the lack of observer/target cross correlations.

The programming utilized in the present invention propagates the square root of the covariance matrix in order to preserve the system's dynamic range. The inverse of the square root of the covariance matrix is propagated to avoid singularity problems.

As described hereinabove, the present application can track 128 aircraft. A full Kalman filter for this number of aircraft would require a 768×768 covariance matrix. To reduce the number of calculations and complexity in the system of the present invention, we utilize 128 6×6 diagonal blocks of the observer/target cross correlation matrices.

The system of the present invention eliminates the customary 8001 6×6 target/target cross correlation matrices as they are not significant to the overall problem solution and significantly increase the amount of processing necessary.

By reducing the number of cross correlations, significant reduction in processing requirements are obtained. The system of the present invention utilizes only the current observer/target cross correlation matrix to update the current target position. When an update is made to the observer aircraft state vector, the present application's Kalman filter corrects all target state vectors in a sub-optimal fashion to enhance processing speed. Target state vectors are corrected only in special cases such as that described with regard to FIG. 14.

Two heuristic assumptions are utilized to compensate for the reduction in observer/target cross correlation matrices. Each time the observer aircraft state is updated, 50% of the observer measurement update is added to each target aircraft state. This is done by subtracting these differences from the coordinate system center and SSR positions to reduce processing time. A second heuristic assumption adjusts target Q matrix diagonals to be at least as large as the corresponding observer aircraft Q matrix diagonals before each target update. Hence, the target state adjustments required by adjustments in observer aircraft state estimates do not lag behind the observer state adjustments.

Figure 10:
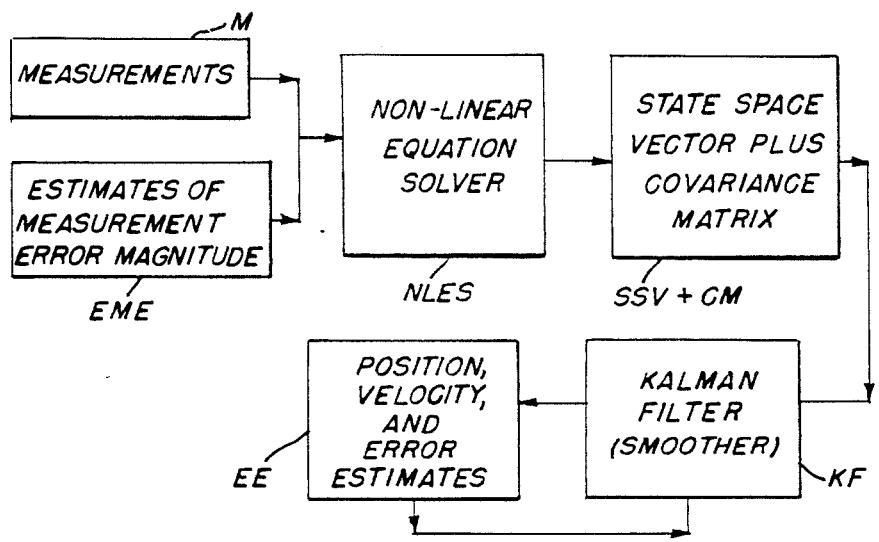
FIG. 10 further illustrates the operation of the state state processor.

The system of the present invention calculates the covariance matrices and system error estimates from input data packets and from estimates of measurement, error and magnitude EME as illustrated in FIG. 10. FIG. 10 shows the covariance matrix processing which goes along with FIG. 9. The state space processor algorithms conduct all nonlinear equation solving with nonlinear equation solver NLES to obtain state space vectors of the measurements and covariance matrices based upon estimates of measurement error of magnitude. The current state space and vector values and the covariance matrices are used in a Kalman filtering process to update position velocity and error estimates.

The system of the present invention utilizes a unique Kalman filter adaptation algorithm to reduce filter divergence. While conventional adaptive Kalman filtering varies the Kalman gain matrix K adaptively, the adaptive Kalman filter of FIG. 11 utilized in the present application varies the covariance matrix Q adaptively. The Kalman filter KF of FIGS. 9 and 10 as illustrated in FIG. 11 is periodically monitored at step KA2 to determine if the state space updates at step KA1 developed by the present measurement data and the immediately preceding measurement data are of the same sign. If the state space update data developed by present measurement data and immediately past measurement data are the same sign, the individual components of the state space update vector are monitored to see if they have maintained the same sign at least h times in a row as shown in step KA5. If the corresponding entry of the Q matrix has been the same for h times as detected in step KA6, then the corresponding portion of the Q matrix is doubled in step KA7. Otherwise, no change is made to the Q matrix. In the event the sign of the state space update at measurement time k and at measurement time k−1 are not the same, as determined in step KA2, then that corresponding Q entry will normally be halved in step KA4. However, in step KA3 detects whether the magnitude squared of the state space update vector is less than the appropriate diagonal element of the covariance matrix. If the magnitude squared of the state space update variable is determined to be small in step KA3, then no change in Q occurs.

The adaptive variation of Q according to the teachings of the present invention allows the system of the present invention to more accurately track turning aircraft. When a diverging state occurs, the filter bandwidth is opened up by doubling a corresponding Q matrix diagonal entry. When the sign of consecutive state space updates and overshoot is detected then the bandwidth is reduced by halving the corresponding Q entry.

Despite the adaptive variation of Q as illustrated in FIG. 11, no Q matrix component is ever allowed to be less than its initial value. All Q matrix adjustments are performed after the current state is incorporated in. This in effect, provides a very mild form of data editing which prevents an isolated large value from having an inordinate effect. The system of the present invention additionally prevents the target Q matrices from having a Q matrix component less than the corresponding component of the observer aircraft Q matrix. This adjustment is performed at the beginning of each target position update and compensates, in part, for the reduction in observer/target cross correlations matrices.

The system of the present invention further adjusts the off diagonal elements of the Q matrix adaptively. This is equivalent to adjusting correlation coefficients of position error with respect to velocity error. These correlation coefficients are normally close to one. However, decreasing these correlation coefficients generally causes old data to be forgotten more quickly, thereby increasing the responsiveness of the Kalman filter to new data. Reduction of the off diagonal elements of the Q matrix aids in the tracking of turning aircraft. In the preferred embodiment, the correlation coefficients are varied between the following values:

$$.5, .75, .87, .92, .96, .98, \text{ and } .99.$$

When a particular Q matrix diagonal entry is doubled m times in a row, then its cross correlation coefficient is decremented by m values. If both a position entry and a corresponding velocity entry are doubled, then their cross correlation coefficient is decremented by two values. When no doubling occurs, the cross correlation coefficient is incremented by two values. Accordingly, the Q matrix off-diagonal adaptation loop runs must faster than the adaptation loop for the Q matrix diagonals. This aids in the fast tracking of turning aircraft further enhancing the adaptive utilization of current data according to the teachings of the present invention.

PROCESSING IMPLEMENTATION OF THE SOFTWARE SYSTEM

In the preferred embodiment, the system of the present invention utilizes a Texas Instruments TMS32020 as the central processing unit 10. However, any central processing unit of comparable performance may be used according to the teachings of the present invention. As discussed herein, the algorithms utilized in the present invention are designed to reduce the number of computations, to the extent possible. An attempt has been made to pack as much information as possible into 16 bit words to reduce necessary double precision calculations. The system of the present invention provides a resolution of aircraft position of 20 meters with a range of 1131 kilometers. This dynamic range is due in fact to the conservation effect of utilizing the square roots of the covariance matrices. All calculations by the state space processor are performed in an earth fixed coordinate system centered near the observer aircraft. The use of such a system avoids the need for considering Correolus terms to describe straight line motion. Further, the number of bits necessary to carry position vectors is reduced. After the relative positions of the SSRs, observer aircraft and target aircraft are determined in this earth fixed coordinate system, the coordinates are then easily related to latitude, longitude and altitude. The system of the present invention extensively utilizes vector manipulation of parameters to simplify algorithm development, produce more reliable software and enhance the ability to modify software. The state space includes position of velocity estimates for all aircraft, the state space vector for each aircraft includes three position and three velocity components. In the absence of updates, straight line constant velocity dynamics are assumed. Dual states for those targets without altimeters are carried by the system of the present invention into both the threat classifier 100 and display 110 until the error solution diverges to clearly establish its incorrectness.

The Kalman filtering software of the present application is best described by the pseudocode provided in the attached appendix. A resource allocation algorithm additionally processes target data packets before SSR data packets and processes the oldest data packets prior to more newly received data packets. New incoming data is thrown away until processing is completed on the old data.

The operating system performs a kind of foreground-background processing, processing operations which require only minimal interruptions and which are limited to a few hundred instructions first. For example, gathering of data for a target packet is foreground processed. Background processing performs operations which may be interrupted without harm, such as bearing computation and Kalman filtering. The amount of background processing is limited only by the available processing power.

The system of the present application uses a conventional overall operating system which is therefore not described in detail. This operating system schedules foreground tasks in a strict priority fashion and prioritizes system routines in a conventional fashion. The data collection routines are prioritized by the overall operating system in the following order. First, SSR main beam collection is performed to determine which SSRs sent the signal and to eliminate side load accesses. Such elimination of side load accesses, known as de-fruiting, is well known in the art of radar and radiowave signal discrimination. The SSR main beam collection further marks the collection time (TM) in a current SSR list. Target information collection is of second priority and the target data packets are constructed. The observer collection is then performed to construct the observer data packet and the SSR omni collection is performed to construct the SSR data packet. Again, data collection is given priority over data processing functions.

SSR Data Gathering

At regular intervals, the general operating system initiates an SSR data packet creation subroutine. In addition, each time a main SSR main beam is identified, the time in which the beam sweeps the observer aircraft is collected to update the SSR data packet (the current SSR list). All SSRs within a 600-nautical mile radius of the earth fixed coordinate system center used by the state space processor are placed on a current SSR list. This current SSR list is sorted by distance from the coordinate system center through use of a bubble sort. Discrimination of individual SSR signals for identification with SSRs on the current list is based on pulse repetition rate first and signal strength second. Identification may also be based on the SSR observer aircraft angle, but only when the observer aircraft position is well known. Along with each SSR on the list, the times of the last two main beam receptions is stored. This is used to compute the SSR scan rate for calculation of $\theta$. A subset of current SSR list is the active SSR list which includes the closest SSRs in a 330-nautical mile radius of the coordinate system center. Only SSRs with signals (main beam or omni) which have been observed fairly recently are included in the active SSR lists. At the most, six SSRs are included in the active list. All target transponder responses not responsive to SSRs on the active SSR list are ignored based on PRF. Likewise omni-directional signals are only collected from SSRs in the active SSR list. For each SSR, the list contains the SSR data packet SSRDP, the SSR state space coordinates and the SSR axis of rotation vector in the state space coordinates. This information is used by the state space processor, as needed. However, only information concerning SSRs on the active SSR list is utilized by the state space processor.

Periodically, the state space coordinate system based on earth centered fixed coordinates is recentered at the current position of the observer aircraft. This prevents the numbers being handled by the state space processor from becoming too large. When the state space coordinate system is recentered, the positions of SSRs and their axes of rotation are recomputed and the current active SSR lists are updated.

As supplementary processing, the earth centered fixed coordinates of the observer aircraft may be converted into longitude and latitude. This is a well documented process as the relationship of the relative position in state space coordinates to actual position will normally be known.

Background Processing

Background processing includes coordinate system recentering, active flight list data base compression, omni SSR data collection, some miscellaneous signal processing and all Kalman filtering which is prioritized according to order of data packet filling. Input data types and errors of magnitude are computed from measurements and covariance matrix calculations are performed, as well as the accumulation of state space solutions to nonlinear equations. Background processing includes display updating, threat assessment, and operator and interaction and initialization. The main program for a background test runs in an endless loop to perform the above mentioned functions. The loop frequently tests for freshly filled observer, target and SSR data packets and calls subroutines to process filled data packets. The main program also periodically actuates subroutines, as necessary.

Threat Classification and Display

Although the system of the present application is primarily directed to the determination of position and velocity of the observer and target aircraft, this system may include any form of known threat classifier 100. Such threat classifiers are well known in collision avoidance systems and while in the preferred embodiment is also controlled by the central processing unit 10 under software control, may take any form. In the preferred embodiment, the threat classifier classifies potential collision threat by three levels.

The threat classifier of the p resent invention does not even consider threat possibility unless the following conditions are met. The target must be within 10 nautical miles of the observer aircraft, the target altitude must be within 1,000 feet of the altitude of the observer aircraft, and the target range rate must be negative. The target range rate is the closing velocity between the target and observer aircrafts. The threat filter of the present invention considers all aircraft meeting the above mentioned parameters and periodically monitors their position and velocity vectors with respect to the position and velocity vector of the observer aircraft. For each target, tau, the range of the target from the observer aircraft divided by the range rate is calculated and the target azimuthal range is calculated.

When the target tau falls below 45 seconds or the azimuthal range falls below 5 nautical miles, the target is displayed on the display 110 with a relative velocity vector and relative altitude in hundreds of feet. Thus, all targets satisfying the threat level 1 are displayed on the pilot's collision avoidance system display screen, display 110 of FIG. 2. When the target tau falls below 30 seconds and the target altitude differs less than 1,000 feet from the altitude of the observer aircraft, the target satisfies threat level 2. The target is displayed with its velocity vector and relative altitude numeric and further, the target symbol flashes at 3 hertz An aural alarm sounds a low chime.

If the target tau falls below 20 seconds and the target altitude difference falls below 500 feet, threat level 3 is satisfied. Again, the target is displayed with velocity vector and relative altitude numeric. The target symbol flashes at 5 hertz and an aural alarm sounds a high chime suggesting evasive action.

The above mentioned criteria may be easily adjusted within the teachings of the present invention.

The above description of the preferred embodiment describes one form taken by the present invention. It should be understood that myriad variations and alterations may be performed within the teachings of the present invention. While the preferred embodiment is described with reference to the above presented specification and the accompanying drawings, the scope of the present invention is defined solely by the appended claims.

We claim:

1. In an environment having at least one rotating interrogation signal source, a method of locating the position of at least one target object carrying an interrogation signal responsive transponder from an observer object located remotely from said interrogation signal source, the positions of the observer object, target object and interrogation signal source forming a geometrical arrangement, comprising:

(a) determining the direction of said interrogation signal source by direction finding on said interrogation signal to develop source direction data;

(b) determining the direction to a said target object by direction finding on a transponder signal produced by said transponder to develop target direction data;

(c) assembling additional available data relevant to relative positions of said objects and/or said interrogation signal source, said additional data being selected to form a data set best suited to develop a present position estimate of said target object in the present geometrical arrangement;

(d) developing a present position estimate of said target object based on said direction data and said data set of additional data; and (e) developing a present position value of said target object by using a past position value to modify the present position estimate including varying the degree of modification based on a value associated with said present position value:

said steps (d) and (e) performing the continuous tracking of target object position through geometrical arrangements where the target object position is not readily observable from a single interrogation signal source to allow full time tracking of said target object even when transmitting responses to interrogation signals from only a single interrogation signal source independent of said geometrical arrangement.

2. The method of claim 1 further comprising:
assembling said direction data and said data set of additional data into vector data packets;
said step (d) of developing utilizing said data packets to develop said present position data.

3. The method of claim 1 further comprising:
estimating the error in said direction data and said additional available data to develop error data associated with said data;
developing a current position error estimate using said error data;
said step (e) of developing using said current position error estimate as said value associated with said present position value to determine the relative weight to give said present position value.

4. The method of claim 1 further comprising:
determining the degree of accuracy of each element of said direction data and said additional available data in determining position of said target object and developing an error estimate associated with each said data element;
said step (d) of developing utilizing said error estimates in determining the weight to be attributed to each said data element in developing said present position estimate.

5. The method of claim 4 wherein said step (e) of developing utilizes said current position error estimate as said value associated with said present position value to determine the weight to give said present position estimate in determining said present position value.

6. The method of claim 1 wherein said target and observer objects are aircraft.

7. The method of claim 4 wherein said target and observer objects are aircraft.

8. The method of claim 6 wherein said rotating interrogation signal source is an air traffic control secondary surveillance radar (SSR).

9. The method of claim 5 wherein said process is iteratively performed.

10. The method of claim 5 wherein said step (b) of determining includes direction finding only on said transponder signals received by said observer aircraft level received within a predetermined time after receipt of said interrogation signal.

11. The method of claim 5 wherein said step (e) of developing utilizes optimal Kalman filtering.

12. The method of claim 11 wherein said Kalman filtering is adaptive.

13. The method of claim 12 wherein a covariance matrix Q of said Kalman filter is varied adaptively.

14. In an environment having at least one rotating interrogation signal source, a method of locating the position of at least one target object carrying an interrogation signal responsive transponder from an observer object comprising:
  (a) determining the position of the observer object with respect to said interrogation signal source;
  (b) determining the direction of said target object by direction finding on said transponder to develop a target direction vector;
  (c) determining the speed of rotation of said interrogation signal source;
  (d) calculating the angle theta swept by said interrogation signal between said observer object and target object from the speed of rotation of said interrogation signal source;
  (e) determining the vertical altitude of said target object from a transmission developed from the target aircraft transponder;
  said altitude of said target aircraft, angle theta and direction to the target aircraft from the observer aircraft forming elements of data;
  (f) determining the degree of accuracy of each element of said data and developing an error estimate associated with each said data element;
  (g) developing an estimate of the present position of said target aircraft relative to said observer aircraft from the altitude of said target aircraft, the angle theta and the direction to said target aircraft from said observer aircraft;
  said step (g) of developing utilizing said error estimates in determining the weight to be attributed to each said data element in developing said present position estimate;
  (h) developing a present position value of said target object by using a past position value to modify the present position estimate including varying the degree of modification based on a value associated with said present position value.

15. The method of claim 14 wherein said step (h) of developing utilizes said current position error estimate as said value associated with said present position value is determining the relative weight to give said present position estimate in determining said present position value.

16. The method of claim 14 wherein said target and observer objects are aircraft.

17. The method of claim 15 wherein said target and observer objects are aircraft.

18. The method of claim 14 wherein said step (h) of developing is performed by optimal Kalman filtering wherein a covariance matrix Q of said Kalman filter is varied adaptively.

19. In an environment having at least one rotating interrogation signal source, a method of locating the position of at least one target object carrying an interrogation signal responsive transponder from an observer object comprising:
  (a) determining the time difference of arrival between receipt of the interrogation signal by said observer object and receipt of an interrogation response generated by the transponder of the target object;
  (b) calculating Kappa, the sum of the distance from the interrogation signal source to the target object and the distance between said observer object and said target object minus the distance between the interrogation signal source and the observer object from said time difference of arrival;
  (c) establishing an observer aircraft plane of the observer object;
  (d) determining the direction of said target object by direction finding on said transponder to develop a target direction vector;
  (e) determining the intersections of an ellipsoid described by Kappa and a plane containing said target direction vector normal to said observer aircraft plane to form first and second target object current solutions;
  (f) developing a present position value by using a past position value of each said solution to modify its associated target object current solution to determine first and second present position values of said target aircraft;
  (g) monitoring said first and second solutions to detect improper divergence and discarding the one of said first and second solutions determined to be clearly erroneous thereby allowing tracking of said target object even when transmitting responses without attitude information in response to interrogation signals from a single interrogation signal source.

20. A method of tracking from an observer aircraft the position of at least one target aircraft transmitting a response to an interrogation radar signal from an interrogation radar positioned remotely from said observer aircraft comprising:
  (a) selecting various data criteria relevant to the position of said target aircraft including criteria obtained from the target aircraft's response to the interrogation radar signal;
  (b) accumulating measured data values from each said data criteria;
  (c) estimating the error of each of said data values to develop data value error estimates;
  (d) developing a present position estimate of said target object and an associated position error estimate from said data values and data value error estimates; and
  (e) developing a present position value of said target aircraft by using a past position value of the position of said target aircraft to modify the present position estimate including varying the degree of modification based on the position error estimate to optimize the developed position value.

21. The method of claim 20 wherein each said position values has an error estimate associated therewith.

22. The method of claim 20 wherein said steps (d) and (e) are performed by optimal filtering.

23. The method of claim 22 wherein said error estimates are used as covariance matrix elements in said steps (d) and (e) of developing.

24. The method of claim 20 wherein the position of the observer aircraft, each said target aircraft and each said interrogation radar form a geometrical arrangement;

said method performing the continuous tracking of target aircraft position through geometrical arrangements where the target aircraft position is not readily observable from a single interrogation radar to allow full time tracking of said target aircraft, independent of said geometrical arrangement.

25. The method of claim 20 wherein said step (c) adaptively varies the estimate of the error of at least one data value based on a varying condition to form its associated data value error estimate thereby further optimizing the present position value.

26. The method of claim 25 wherein said error estimates are used as covariance matrix elements in said steps (d) and (e) of developing.

* * * * *